United States Patent
Yonenaga et al.

(10) Patent No.: US 8,005,374 B2
(45) Date of Patent: Aug. 23, 2011

(54) OPTICAL TRANSMISSION SYSTEM, OPTICAL TRANSMITTER FOR OPTICAL TRANSMISSION SYSTEM, AND OPTICAL RECEIVER FOR OPTICAL TRANSMISSION SYSTEM

(75) Inventors: Kazushige Yonenaga, Yokosuka (JP); Mikio Yoneyama, Tokyo (JP); Masahito Tomizawa, Yokosuka (JP); Akira Hirano, Yokohama (JP); Shoichiro Kuwahara, Yokosuka (JP); Tomoyoshi Kataoka, Yokohama (JP); Akihide Sano, Yokohama (JP); Gentaro Funatsu, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 12/723,210

(22) Filed: Mar. 12, 2010

(65) Prior Publication Data
US 2010/0172653 A1 Jul. 8, 2010

Related U.S. Application Data

(62) Division of application No. 10/555,710, filed as application No. PCT/JP2005/004817 on Mar. 17, 2005, now Pat. No. 7,734,194.

(30) Foreign Application Priority Data

Mar. 17, 2004 (JP) ................. 2004-076746

(51) Int. Cl.
*H04B 10/06* (2006.01)
(52) U.S. Cl. ........ 398/208; 398/188; 398/140; 398/158; 398/163; 398/183; 398/212; 398/213
(58) Field of Classification Search .................. 398/140, 398/158, 163, 183, 186, 188, 208, 212, 213
See application file for complete search history.

(56) References Cited

U.S. PATENT DOCUMENTS
5,359,449 A * 10/1994 Nishimoto et al. ........... 398/198
(Continued)

FOREIGN PATENT DOCUMENTS
JP 63-052530 3/1988
(Continued)

OTHER PUBLICATIONS

Nishizawa et al: "10-Gb/s Optical DPSK Packet Receiver Proof Against Large Power Fluctuations", IEEE Photonics Technology Letter, vol. 11, No. 6, Jun. 1999, pp. 733-735.*

(Continued)

*Primary Examiner* — Li Liu
(74) *Attorney, Agent, or Firm* — Harness, Dickey & Pierce, P.L.C.

(57) ABSTRACT

An optical transmission system is provided in which the optimum operating point of a Mach-Zehnder interferometer, matched to the optical frequency of the light source on the transmitting side, can be set. The optical receiver (2) has an infinitesimal-modulated signal component detection circuit (222), which uses the signal train output from a balanced detection circuit (221) to detect the infinitesimal-modulated signal component applied to the phase adjustment terminal (201) of an MZI (200) by an infinitesimal-modulated signal oscillation circuit (224); a synchronous detection circuit (223), which synchronously detects the infinitesimal-modulated signals output from the infinitesimal-modulated signal component detection circuit (222) and infinitesimal-modulated signal oscillation circuit (224) and detects the error signal component arising from the shift between the optical signal carrier frequency and the optical frequency characteristic of the MZI (200); and a controller (207), which outputs a control signal to adjust the phase difference between two split optical signals output from the MZI (200) so as to correct the shift amount.

6 Claims, 26 Drawing Sheets

U.S. PATENT DOCUMENTS

| | | | |
|---|---|---|---|
| 6,005,695 | A | 12/1999 | Roberts |
| 6,271,959 | B1 * | 8/2001 | Kim et al. ................ 359/325 |
| 6,317,249 | B1 | 11/2001 | Nakamoto et al. |
| 6,362,913 | B2 | 3/2002 | Ooi et al. |
| 6,396,605 | B1 * | 5/2002 | Heflinger et al. ........... 398/140 |
| 7,127,183 | B2 | 10/2006 | Oguma |
| 7,177,547 | B1 | 2/2007 | Case et al. |
| 2002/0001116 | A1 | 1/2002 | Kajiya et al. |
| 2005/0047780 | A1 * | 3/2005 | Hoshida et al. ............. 398/33 |

FOREIGN PATENT DOCUMENTS

| | | | |
|---|---|---|---|
| JP | 02-113736 | | 4/1990 |
| JP | 04-294318 | | 10/1992 |
| JP | 07-066482 | | 3/1995 |
| JP | 08-248366 | | 9/1996 |
| JP | 08-279785 | | 10/1996 |
| JP | 09-83433 | | 3/1997 |
| JP | 10-065615 | | 3/1998 |
| JP | 10-178397 | | 6/1998 |
| JP | 63-228829 | | 9/1998 |
| JP | 2000-59300 | | 2/2000 |
| JP | 2000-162563 | | 6/2000 |
| JP | 2000-171766 | | 6/2000 |
| JP | 2000-206474 | | 7/2000 |
| JP | 2001-251250 | | 9/2001 |
| JP | 2002-23120 | | 1/2002 |
| JP | 2002-023122 | | 1/2002 |
| JP | 2002-111123 | | 4/2002 |
| JP | 2002-156667 | | 5/2002 |
| JP | 2003-309520 | * | 10/2003 |
| JP | 2004-032461 | | 1/2004 |
| JP | 2004-037647 | * | 2/2004 |
| JP | 2005-535271 | | 11/2005 |
| WO | 2004/013991 | | 2/2004 |

OTHER PUBLICATIONS

Leibrich et al: "CF-RZ-DPSK for Suppression of XPM on Dispersion-Managed Long-Haul Optical WDM Transmission on Standard Single-Mode Fiber", IEEE Photonics Technology Letter, vol. 14, No. 2, Feb. 2002, pp. 155-157.*

Milivojevic et al: "Practical 40Gbit/s CSRZ-DPSK Transmission System With Signed Online Chromatic Dispersion Detection", Proc. ECOC'03 Rimini, Italy 2 (2003) Tu3.6.4, pp. 268-269.*

Swanson et al: "High Sensitivity Optically Preamplified Direct Detection DPSK Receiver With Active Delay-Line Stabilization", IEEE Photonics Technology Letter, vol. 6, No. 2, Feb. 1994, pp. 263-265.*

Nishizawa et al: "10-Gb/s Optical DPSK Packet Receiver Proof Against Large Power Fluctuations," IEEE Photonics Technology Letter, vol. 11, No. 6, Jun. 1999, pp. 733-735.

Leibrich et al: "CF-RZ-DPSK for Suppression of XPM on Dispersion-Managed Long-Haul Optical WDM Transmission on Standard Single-Mode Fiber," IEEE Photonics Technology Letter, vol. 14, No. 2, Feb. 2002, pp. 155-157.

Milivojevic et al: "Practical 40Gbit/s CSRZ-DPSK Transmission System with Signed Online Chromatic Dispersion Detection," Proc. ECOC'03 Rimini, Italy 2 (2003) Tu3.6.4, pp. 268-269.

Swanson et al: "High Sensitivity Optically Preamplified Direct Detection DPSK Receiver with Active Delay-Line Stabilization," IEEE Photonics Technology Letter, vol. 6, No. 2, Feb. 1994, pp. 263-265.

* cited by examiner

OPTICAL TRANSMISSION SYSTEM, OPTICAL TRANSMITTER FOR OPTICAL TRANSMISSION SYSTEM, AND OPTICAL RECEIVER FOR OPTICAL TRANSMISSION SYSTEM

This application is a divisional of U.S. patent application Ser. No. 10/555,710, filed on Aug. 11, 2006 which is a National Stage of International Application No. PCT/JP2005/004817, filed on Mar. 17, 2005. This application claims the benefit and priority of Japanese Patent Application No. 2004-076746, filed on Mar. 17, 2004. The entire disclosures of each of the above applications are incorporated herein by reference.

TECHNICAL FIELD

This invention relates to an optical transmission system, optical transmitter in an optical transmission system, and optical receiver in an optical transmission system, to which a DPSK-DD scheme is applied.

BACKGROUND ART

The arrival of the age of broadband transmission has been accompanied by demands for optical transmission systems with ever-greater capacities. It is becoming comparatively easier to achieve large capacities through wavelength division multiplex (WDM) technology, but there has also been much study of measures to raise the bit rate per wavelength. This is because by raising the bit rate per wavelength, device costs can be reduced, device sizes can be decreased, and power consumption can be lowered, enabling reductions in the initial costs and running costs for overall systems.

Electrical circuits which realize 40 Gbit/s/CH have already reached the stage of commercialization. In the WDM transmission of such high-speed optical signals, limitations on the distance of transmission due to chromatic dispersion, limits to the power input to fibers arising from fiber nonlinearity, and other problems arise. In particular, in recent years there has been much study of Differential Phase Shift Keying-Direct Detection (DPSK-DD) schemes as a means of coping with fiber nonlinearity.

Further, WDM transmission technology employing RZ (Return-to-Zero)-DPSK schemes and CS (Carrier Suppressed) RZ-DPSK schemes, which are still more resistant to nonlinearity, is also being studied. It is said that compared with the NRZ codes (Non-Return-to-Zero codes) used in conventional optical transmission systems, RZ codes are better able to accommodate input power limitations.

In a receiver employing DPSK-DD schemes (including RZ-DPSK, CSRZ-DPSK, and other RZ-type DPSK-DD schemes), a photodetector is used for direct detection after conversion into intensity-modulated codes of phase-modulated signals, using a demodulator such as Mach-Zehnder interferometer or similar. At this time, by using a double-balanced receiver, differential photo-detection is possible, and the discrimination sensitivity is improved by 3 dB compared with cases in which intensity-modulated signals are directly detected using a single photodetector; hence double-balanced receivers are generally used as the photodetector.

In order to use a Mach-Zehnder interferometer to demodulate phase-modulated signals into intensity-modulated signals, the path difference between the two paths of the Mach-Zehnder interferometer must be controlled at the wavelength level to follow fluctuations in the signal light wavelength. Methods to execute this control include, for example, a method in which the output level of the balanced photodetector is detected and a phase shifter provided in one arm of the interferometer is controlled such that a constant output level is obtained, as explained in Patent Reference 1.

As a Mach-Zehnder interferometer, an optical waveguide-type device fabricated on a PLC (Planar Lightwave Circuit) is marketed commercially. As the method of control of the path difference, it is possible to either control the substrate temperature (amount of change in pass band: 1.4 GHz/° C.), or to execute control by heating using a heater provided on both arms (amount of phase change: 1.33 π/W).

Patent Reference 1: Japanese Unexamined Patent Application, First Publication No. S63-52530

DISCLOSURE OF INVENTION

Problem to be Solved by the Invention

However, in the "receiver for coherent optical communication" explained in Japanese Unexamined Patent Application, First Publication No. S63-52530, because the optimum point of the phase shifter is the detection signal level maximum value, even if the absolute value of the shift between the signal light wavelength and the pass band of the interferometer can be detected, the direction of the shift cannot be detected. This has been one issue in the prior art requiring study.

When applying such methods to WDM transmission systems, because the WDM wavelength spacing and the repetition frequency of the Mach-Zehnder interferometer generally do not match, the path difference in the Mach-Zehnder interferometer must be controlled. (Expressed in terms of the frequency domain, the pass band wavelength of the Mach-Zehnder interferometer must be controlled.) When the signal rate is high, the controlled range broadens. For example, for 40 Gbit/s signals, the repetition frequency of the Mach-Zehnder interferometer is 40 GHz, and so the difference between the oscillation wavelength and the pass band of the Mach-Zehnder interferometer is at maximum 20 GHz. If the Mach-Zehnder interferometer is on a PLC, and the pass band is controlled through the substrate temperature, then the temperature must be varied by approximately 15° C., so that a large amount of power must be consumed. This is a second issue requiring study.

The present invention was devised in light of the above circumstances, and has as an object the provision of an optical transmission system, optical transmitter for an optical transmission system, and optical receiver for an optical transmission system enabling setting of the optimum operating point of the Mach-Zehnder interferometer, which matches the optical frequency of the light source on in the transmitting side.

Means for Solving the Problem

In order to attain the above objects, an optical transmission system of this invention comprises: an optical transmitter which outputs differential-encoded phase-modulated light; and an optical receiver which detects the phase-modulated light and performs demodulation, wherein the optical transmitter comprises: an encoder which converts NRZ code input signals into NRZ-I code signals; and a phase modulator which, for marks and spaces encoded by the encoder, outputs phase-modulated light with a phase deviation $\Delta\phi$ imparted over a range $0 \leq \Delta\phi \leq \pi$, the optical receiver comprises: a Mach-Zehnder interferometer with phase-adjustment terminal to set a phase difference between two interfering signals, which splits the phase-modulated light which has been received into two signal light beams, delays one of the split signal light beams by one bit, and causes the two signal light beams to interfere to effect conversion into intensity-modulated light; a balanced detection circuit which performs photoelectric conversion of signal light from two output ports of the Mach-Zehnder interferometer, and outputs a difference in converted electrical signals; a low-frequency signal generation circuit which applies a first low-frequency signal at frequency f1 to the phase-adjustment terminal of the Mach-Zehnder interferometer; an infinitesimal-modulated signal component detection circuit which detects a second low-frequency signal from a signal supplied by the balanced detection circuit; a synchronous detection circuit which, by synchronous detection of the second low-frequency signal output from the infinitesimal-modulated signal component detection circuit using the first low-frequency signal output from the low-frequency signal generation circuit, detects a shift amount and direction of shift between a center wavelength of the phase-modulated light output from the optical transmitter and a pass band wavelength of the Mach-Zehnder interferometer; a control circuit which outputs a control signal to adjust the phase difference between the two split signal light beams so as to correct the shift amount; and a driver circuit which drives the phase adjustment terminal based on the control signal.

In an optical transmission system of this invention, the infinitesimal-modulated signal component detection circuit may comprise: an eye-opening monitoring circuit which outputs a signal obtained by monitoring an eye opening of a signal split from the signal output from the balanced detection circuit; and a band-pass filter which passes the second low-frequency signal contained in the signal output from the eye-opening monitoring circuit, the synchronous detection circuit may detect the shift amount and direction based on an output signal of the band-pass filter.

In an optical transmission system of this invention, the infinitesimal-modulated signal component detection circuit may comprise: a data regeneration circuit which discriminates and regenerates an electrical signal output from the balanced detection circuit and which is provided with a code error detection function; an error count monitoring circuit which outputs a signal obtained by monitoring the number of errors output from the data regeneration circuit; and a band-pass filter which passes the second low-frequency signal contained in the signal output from the error count monitoring circuit, the synchronous detection circuit may detect the shift amount and direction based on an output signal of the band-pass filter.

In an optical transmission system of this invention, the balanced detection circuit may comprise an equalizing amplification circuit, the infinitesimal-modulated signal component detection circuit may comprise: a current consumption monitoring circuit which outputs a signal obtained by monitoring the current consumption of the equalizing amplification circuit; and a band-pass filter which passes the second low-frequency signal contained in the signal output by the current consumption monitoring circuit, the synchronous detection circuit may detect the shift amount and direction based on an output signal of the band-pass filter.

In an optical transmission system of this invention, the balanced detection circuit may comprise: an optical splitting unit which splits into two each of the two output ports of the Mach-Zehnder interferometer; an optical coupling unit which causes interference between two light beams split by the optical splitting unit; and an optical detection unit which converts an optical signal output from the optical coupling unit into an electrical signal, the infinitesimal-modulated signal component detection circuit may comprise a band-pass filter which passes the second low-frequency signal contained in the electrical signal output from the optical detection unit, the synchronous detection circuit may detect the shift amount and direction based on an output signal of the band-pass filter.

In an optical transmission system of this invention, a free spectral range of the Mach-Zehnder interferometer may be shifted somewhat from the clock rate of a main signal, the infinitesimal-modulated signal component detection circuit may comprise: a first amplifier which amplifies an optical current of one of photodetectors forming the balanced optical detection circuit; and a band-pass filter which extracts a component of the second low-frequency signal from an output of the first amplifier, the synchronous detection circuit may detect the shift amount and direction based on an output signal of the band-pass filter.

In an optical transmission system of this invention, the infinitesimal-modulated signal component detection circuit may further comprise: a second amplifier which amplifies an optical current of the other of the photodetectors forming the balanced detection circuit; and a subtracter which outputs a difference between an output of the first amplifier and an output of the second amplifier, the band-pass filter may extract the component of the second low-frequency signal from an output of the subtracter.

In an optical transmission system of this invention, the infinitesimal-modulated signal component detection circuit may comprise: a clock extraction circuit which extracts a clock signal from a signal train output from the balanced detection circuit; and a low-frequency signal extraction circuit which extracts the second low-frequency signal superposed on the clock signal output from the clock extraction circuit, the synchronous detection circuit may detect the shift amount and direction based on the second low-frequency signal output from the low-frequency signal extraction circuit.

In an optical transmission system of this invention, the optical transmitter may comprise: a clock signal generation circuit which generates a clock signal having the same bit rate as a signal bit rate; and an intensity modulator which performs intensity modulation of the phase-modulated light using the clock signal output by the clock signal generation circuit, the balanced detection circuit may comprise: an optical splitting circuit which splits one of the two output ports of the Mach-Zehnder interferometer; and a monitoring photodetector connected to the optical splitting circuit, the infinitesimal-modulated signal component detection circuit may comprise: a narrow-band amplifier which extracts a clock on which the second low-frequency signal is superposed from intensity-modulated light output from the monitoring photodetector; and a power detection circuit which extracts the second low-frequency signal from the extracted clock, the synchronous detection circuit may detect the shift amount and direction based on an output signal of the power detection circuit.

In an optical transmission system of this invention, the infinitesimal-modulated signal component detection circuit may comprise: a data regeneration circuit which discriminates and regenerates an electrical signal output from the balanced detection circuit; a correlation detection circuit which detects a correlation between an output signal of the data regeneration circuit and a signal before discrimination; and a low-frequency signal extraction circuit which extracts the second low-frequency signal from an output of the correlation detection circuit.

In an optical transmission system of this invention, the optical transmission system may comprise: an intensity modulation unit which performs intensity modulation of the phase-modulated light using a signal at frequency f2 sufficiently high to enable superpositioning of the low-frequency signal at frequency f1; and an intensity-modulated component detection unit which detects an intensity-modulated component at frequency f2, the infinitesimal-modulated signal component detection circuit may extract the second low-frequency signal at frequency f1 superposed onto the detected intensity-modulated component at frequency f2.

In an optical transmission system of this invention, as the intensity modulation unit, the optical transmitter may comprise an oscillation circuit which generates a signal at the frequency f2 and performs direct intensity modulation of a light source of the optical transmitter.

In an optical transmission system of this invention, as the intensity modulation unit, the optical receiver may comprise: an oscillation circuit which generates a signal at the frequency f2; and an intensity modulator which performs intensity modulation of signal light using the signal output from the oscillation circuit.

In an optical transmission system of this invention, as the intensity modulation unit, the optical receiver may comprise: an oscillation circuit which generates a signal at the frequency f2; and an optical amplifier connected to the oscillation circuit, and that the gain of the optical amplifier may be modulated by the oscillation circuit at the frequency f2.

In an optical transmission system of this invention, as the intensity-modulated component detection unit, the optical receiver may comprise: an optical splitting circuit which splits one of the two output ports of the Mach-Zehnder interferometer; a monitoring photodetector connected to the optical splitting circuit; and an extraction circuit which extracts the component at the frequency f2 from intensity-modulated light output from the monitoring photodetector.

In an optical transmission system of this invention, as the intensity-modulated component detection unit, the optical receiver may comprise: an input level adjustment unit which renders asymmetric the input levels of the converted intensity-modulated light which is input to the balanced detection circuit; and an extraction circuit which extracts the component at the frequency f2 from an output signal of the balanced detection circuit.

In an optical transmission system of this invention, the infinitesimal-modulated signal component detection circuit may comprise a data regeneration circuit which discriminates and regenerates an electrical signal output from the balanced detection circuit, the optical receiver further may comprise: a logic inversion circuit which inverts the logic of an output signal of the data regeneration circuit and outputs an inverted signal; a selection unit which selectively outputs either the output signal of the data regeneration circuit or an output of the logic inversion circuit according to a prescribed logic specification signal; and a polarity selection unit which inverts the polarity of a feedback error signal within the control circuit when the output of the logic inversion circuit has been selected, an amount of correction of the shift between the center wavelength of the phase-modulated light output from the optical transmitter and the pass band wavelength of the Mach-Zehnder interferometer may be reduced to ½ or less of a repetition frequency of the Mach-Zehnder interferometer.

In an optical transmission system of this invention, the optical receiver may further comprises: a temperature detection circuit which detects the temperature of a substrate of the Mach-Zehnder interferometer; and a loop open/close switch which turns on and off feedback control to the Mach-Zehnder interferometer, when the temperature of the substrate of the Mach-Zehnder interferometer is not within an appropriate range, the loop to perform the feedback control may be opened, whereas when the temperature of the substrate of the Mach-Zehnder interferometer is within the appropriate range, the loop may be closed to perform the feedback control.

In an optical transmission system of this invention, the control circuit may further comprises: a lock detection circuit which detects a locked state of a loop which performs feedback control to the Mach-Zehnder interferometer; and a re-locking circuit which re-locks the loop when the locked state indicates that the loop is unlocked, when the lock detection circuit is detecting that the loop is locked, normal feedback control may be performed, and when the lock detection circuit is not detecting that the loop is locked, a driving signal applied to the phase adjustment terminal of the Mach-Zehnder interferometer may be swept, and if the lock detection circuit once again detects that the loop is locked, switching to a state in which the normal feedback control may be performed.

In an optical transmission system of this invention, the Mach-Zehnder interferometer may provided with two independent phase adjustment terminals, and an output of the infinitesimal-modulated signal oscillation circuit may be applied to one of the two phase adjustment terminals, while a feedback error signal within the control circuit may be applied to the other of the two phase adjustment terminals.

In an optical transmission system of this invention, the optical receiver may comprise: an optical carrier frequency detection unit which detects, from received signal light detected by the balanced detection circuit, a relative position between an optical carrier frequency and an optical frequency characteristic of the Mach-Zehnder interferometer; and an offset setting circuit which provides an offset to a feedback error signal in the control circuit, a value of the offset of the offset setting circuit may be adjusted such that the position of the optical carrier frequency matches a peak position or bottom position of the optical frequency characteristic of the Mach-Zehnder interferometer.

In an optical transmission system of this invention, the optical transmitter may comprise: a modulation state control unit which turns on and off modulation of a main signal; and a first control signal communication unit which communicates with the optical receiver using a control line provided separately from a line for the main signal, the optical receiver may comprise: an optical carrier frequency detection unit which detects, from received signal light detected by the balanced detection circuit, a relative position between an optical carrier frequency and an optical frequency characteristic of the Mach-Zehnder interferometer; an offset setting circuit which provides an offset to a feedback error signal in the control circuit; and a second control signal communication unit which communicates with the optical transmitter using the control line, at the time of startup of the optical transmission system, the optical transmitter may use the modulation state control unit to turn off modulation of the main signal and transmit only an optical carrier, the optical receiver may use the optical carrier frequency detection unit to detect the relative position between the frequency of the optical carrier transmitted from the optical transmitter and the optical frequency characteristic of the Mach-Zehnder interferometer, and may adjust the offset of the offset setting circuit so as to cause a position of the optical carrier frequency to match a peak or bottom position of the optical frequency characteristic of the Mach-Zehnder interferometer, the optical receiver may send a control signal indicating completion of offset adjustment to the optical transmitter using the second control signal communication unit, and, after receiving the control signal, the optical transmitter may turn on modulation of the main signal.

An optical transmitter of a first aspect of the present invention is an optical transmitter, in an optical transmission system comprising: the optical transmitter which outputs differential-encoded, phase-modulated light; and an optical receiver which detects the phase-modulated light and performs demodulation, wherein the optical transmitter comprises: an encoder which converts NRZ code input signals into NRZ-I code signals; and a phase modulator which, for marks and spaces encoded by the encoder, outputs phase-modulated light with a phase deviation $\Delta\phi$ imparted over a range $0 \leq \Delta\phi \leq \pi$, the optical receiver comprises: a Mach-Zehnder interferometer with phase-adjustment terminal to set a phase difference between two interfering signals, which splits the phase-modulated light which has been received into two signal light beams, delays one of the split signal light beams by one bit, and causes the two signal light beams to interfere to effect conversion into intensity-modulated light; and a balanced photodetector which performs photoelectric conversion of signal light from two output ports of the Mach-Zehnder interferometer, and outputs a difference in converted electrical signals, the optical transmitter comprises: a clock signal generation circuit which generates a clock signal having the same bit rate as a signal bit rate; and an intensity modulator which uses the clock signal output from the clock signal generation circuit to perform intensity modulation of the phase-modulated light.

An optical transmitter of a second aspect of the present invention is an optical transmitter, in an optical transmission system comprising: an optical transmitter which outputs differential-encoded, phase-modulated light; and an optical receiver which detects the phase-modulated light and performs demodulation, wherein the optical transmitter comprises: an encoder which converts NRZ code input signals into NRZ-I code signals; and a phase modulator which, for marks and spaces encoded by the encoder, outputs phase-modulated light with a phase deviation $\Delta\phi$ imparted over a range $0 \leq \Delta\phi \leq \pi$, the optical receiver comprises: a Mach-Zehnder interferometer with phase-adjustment terminal to set a phase difference between two interfering signals, which splits the phase-modulated light which has been received into two signal light beams, delays one of the split signal light beams by one bit, and causes the two signal light beams to interfere to effect conversion into intensity-modulated light; and a balanced photodetector which performs photoelectric conversion of signal light from two output ports of the Mach-Zehnder interferometer, and outputs a difference in converted electrical signals, the optical transmitter comprises an oscillation circuit which generates a signal at frequency f2 sufficiently high to enable superpositioning of a low-frequency signal at frequency f1 at which a light source of the optical transmitter is directly intensity-modulated.

An optical receiver of the present invention is an optical receiver, in an optical transmission system comprising: an optical transmitter which outputs differential-encoded, phase-modulated light; and the optical receiver which detects the phase-modulated light and performs demodulation, wherein the optical transmitter comprises: an encoder which converts NRZ code input signals into NRZ-I code signals; and a phase modulator which, for marks and spaces encoded by the encoder, outputs phase-modulated light with a phase deviation $\Delta\phi$ imparted over the range $0 \leq \Delta\phi \leq \pi$, the optical receiver comprises: a Mach-Zehnder interferometer with phase-adjustment terminal to set a phase difference between two interfering signals, which splits the phase-modulated light which has been received into two signal light beams, delays one of the split signal light beams by one bit, and causes the two signal light beams to interfere to effect conversion into intensity-modulated light; a balanced detection circuit which performs photoelectric conversion of signal light from two output ports of the Mach-Zehnder interferometer, and outputs a difference in converted electrical signals; a low-frequency signal generation circuit which applies a first low-frequency signal at frequency f1 to the phase-adjustment terminal of the Mach-Zehnder interferometer; an infinitesimal-modulated signal component detection circuit which detects a second low-frequency signal from a signal supplied by the balanced detection circuit; a synchronous detection circuit which detects a shift amount and direction of shift between a center wavelength of the phase-modulated light output from the optical transmitter and a pass band wavelength of the Mach-Zehnder interferometer, through synchronous detection of the second low-frequency signal output from the infinitesimal-modulated signal component detection circuit using the first low-frequency signal output from the low-frequency signal generation circuit; a control circuit which outputs a control signal to adjust the phase difference between the two split signal light beams so as to correct the shift amount; and a driver circuit which drives the phase adjustment terminal based on the control signal.

In an optical receiver of this invention, the infinitesimal-modulated signal component detection circuit may comprise: an eye-opening monitoring circuit which outputs a signal obtained by monitoring an eye opening of a signal split from the signal output from the balanced detection circuit; and a band-pass filter which passes the second low-frequency signal contained in the signal output from the eye-opening monitoring circuit, and the synchronous detection circuit may detect the shift amount and direction based on an output signal of the band-pass filter.

In an optical receiver of this invention, the infinitesimal-modulated signal component detection circuit may comprise: a data regeneration circuit which discriminates and regenerates an electrical signal output from the balanced detection circuit and which is provided with a code error detection function; an error count monitoring circuit which outputs a signal obtained by monitoring the number of errors output from the data regeneration circuit; and a band-pass filter which passes the second low-frequency signal contained in the signal output from the error count monitoring circuit, the synchronous detection circuit may detects the shift amount and direction based on an output signal of the band-pass filter.

In an optical receiver of this invention, the balanced detection circuit may comprises an equalizing amplification circuit, the infinitesimal-modulated signal component detection circuit may comprise: a current consumption monitoring circuit which outputs a signal obtained by monitoring the current consumption of the equalizing amplification circuit; and a band-pass filter which passes the second low-frequency signal contained in the signal output by the current consumption monitoring circuit, and the synchronous detection circuit may detect the shift amount and direction based on an output signal of the band-pass filter.

In an optical receiver of this invention, the balanced detection circuit may comprise: an optical splitting unit which splits into two each of the two output ports of the Mach-Zehnder interferometer; an optical coupling unit which causes interference between two light beams split by the optical splitting unit; and an optical detection unit which converts an optical signal output from the optical coupling unit into an electrical signal, the infinitesimal-modulated signal component detection circuit may comprise a band-pass filter which passes the second low-frequency signal contained in the electrical signal output from the optical detection unit, the synchronous detection circuit may detect the shift amount and direction based on an output signal of the band-pass filter.

In an optical receiver of this invention, a free spectral range of the Mach-Zehnder interferometer may be shifted somewhat from the clock rate of a main signal, the infinitesimal-modulated signal component detection circuit may comprise: a first amplifier which amplifies an optical current of one of photodetectors forming the balanced optical detection circuit; and a band-pass filter which extracts a component of the second low-frequency signal from an output of the first amplifier, the synchronous detection circuit may detect the shift amount and direction based on an output signal of the band-pass filter.

In an optical receiver of this invention, the infinitesimal-modulated signal component detection circuit may comprise: a second amplifier which amplifies an optical current of the other photodetector forming the balanced detection circuit; and a subtracter which outputs a difference between the output of the first amplifier and an output of the second amplifier, the band-pass filter may extract the component of the second low-frequency signal from an output of the subtracter.

In an optical receiver of this invention, the infinitesimal-modulated signal component detection circuit may comprise: a clock extraction circuit which extracts a clock signal from a signal train output from the balanced detection circuit; and a low-frequency signal extraction circuit which extracts the second low-frequency signal superposed on the clock signal output from the clock extraction circuit, the synchronous detection circuit may detect the shift amount and direction based on the second low-frequency signal output from the low-frequency signal extraction circuit.

In an optical transmission receiver of this invention, the infinitesimal-modulated signal component detection circuit may comprise: a data regeneration circuit which discriminates and regenerates an electrical signal output from the balanced detection circuit; a correlation detection circuit which detects a correlation between an output signal of the data regeneration circuit and a signal before discrimination; and a low-frequency signal extraction circuit which extracts the second low-frequency signal from an output of the correlation detection circuit.

In an optical receiver of this invention, the optical receiver may comprise: an intensity modulation unit which performs intensity modulation of the phase-modulated light using a signal at frequency f2 sufficiently high to enable superpositioning of the low-frequency signal at frequency f1; and an intensity-modulated component detection unit which detects an intensity-modulated component at the frequency f2, the infinitesimal-modulated signal component detection circuit may extract the second low-frequency signal at frequency f1 superposed onto the detected intensity-modulated component at the frequency f2.

In an optical receiver of this invention, as the intensity modulation unit, the optical receiver may comprise: an oscillation circuit which generates a signal at the frequency f2; and an intensity modulator which performs intensity modulation of signal light using the signal output from the oscillation circuit.

In an optical receiver of this invention, as the intensity modulation unit, the optical receiver may comprise: an oscillation circuit which generates a signal at the frequency f2; and an optical amplifier connected to the oscillation circuit, and that the gain of the optical amplifier may be modulated by the oscillation circuit at the frequency f2.

In an optical receiver of this invention, as the intensity-modulated component detection unit, the optical receiver may comprise: an optical splitting circuit which splits one of the two output ports of the Mach-Zehnder interferometer; a monitoring photodetector connected to the optical splitting circuit; and an extraction circuit which extracts the component at the frequency f2 from intensity-modulated light output from the monitoring photodetector.

In an optical receiver of this invention, as the intensity-modulated component detection unit, the optical receiver may comprise: an input level adjustment unit which renders asymmetric input levels of the converted intensity-modulated light which is input to the balanced detection circuit; and an extraction circuit which extracts the component at the frequency f2 from an output signal of the balanced detection circuit.

In an optical receiver of this invention, the infinitesimal-modulated signal component detection circuit may comprise a data regeneration circuit which discriminates and regenerates an electrical signal output from the balanced detection circuit, the optical receiver may further comprise: a logic inversion circuit which inverts the logic of an output signal of the data regeneration circuit and outputs an inverted signal; a selection unit which selectively outputs either the output signal of the data regeneration circuit or an output of the logic inversion circuit according to a prescribed logic specification signal; and a polarity selection unit which inverts the polarity of a feedback error signal within the control circuit when the output of the logic inversion circuit has been selected, an amount of correction of the shift between the center wavelength of the phase-modulated light output from the optical transmitter and the pass band wavelength of the Mach-Zehnder interferometer may be reduced to ½ or less of a repetition frequency of the Mach-Zehnder interferometer.

In an optical receiver of this invention, the optical receiver may further comprise: a temperature detection circuit which detects the temperature of a substrate of the Mach-Zehnder interferometer; and a loop open/close switch which turns on and off feedback control to the Mach-Zehnder interferometer, when the temperature of the substrate of the Mach-Zehnder interferometer is not within an appropriate range, the loop which performs the feedback control may be opened, whereas when the temperature of the substrate of the Mach-Zehnder interferometer is within the appropriate range the loop may be closed to perform the feedback control.

In an optical receiver of this invention, the control circuit may further comprise: a lock detection circuit which detects a locked state of a loop to perform feedback control to the Mach-Zehnder interferometer; and a re-locking circuit which re-locks the loop when the locked state indicates that the loop is unlocked, when the lock detection circuit is detecting that the loop is locked, normal feedback control may be performed, and when the lock detection circuit is not detecting that the loop is locked, a driving signal applied to the phase adjustment terminal of the Mach-Zehnder interferometer may be swept, and if the lock detection circuit once again detects that the loop is locked, switching to a state in which the normal feedback control may be performed.

In an optical receiver of this invention, the Mach-Zehnder interferometer may comprise two independent phase adjustment terminals, and an output of the infinitesimal-modulated signal oscillation circuit may be applied to one of the two phase adjustment terminals, while a feedback error signal within the control circuit may be applied to the other of the two phase adjustment terminals.

In an optical receiver of this invention, the optical receiver may comprise: an optical carrier frequency detection unit which detects, from received signal light detected by the balanced detection circuit, a relative position between an optical carrier frequency and an optical frequency characteristic of the Mach-Zehnder interferometer; and an offset setting circuit which provides an offset to a feedback error signal in the control circuit, a value of the offset of the offset setting circuit may be adjusted such that the position of the optical carrier frequency matches a peak position or bottom position of the optical frequency characteristic of the Mach-Zehnder interferometer.

Effects of the Invention

As explained above, by means of this invention the phase difference in the signal light of the two arms of a Mach-Zehnder interferometer provided in an optical receiver of an optical transmission system employing a DPSK-DD scheme can be modulated at a constant frequency, and by detecting the phase of the frequency component, it is possible to set the optimum operating point of the Mach-Zehnder interferometer matching the optical frequency of the light source on the transmitting side, so that optimal photo-detection characteristics can be achieved.

Figure 1:
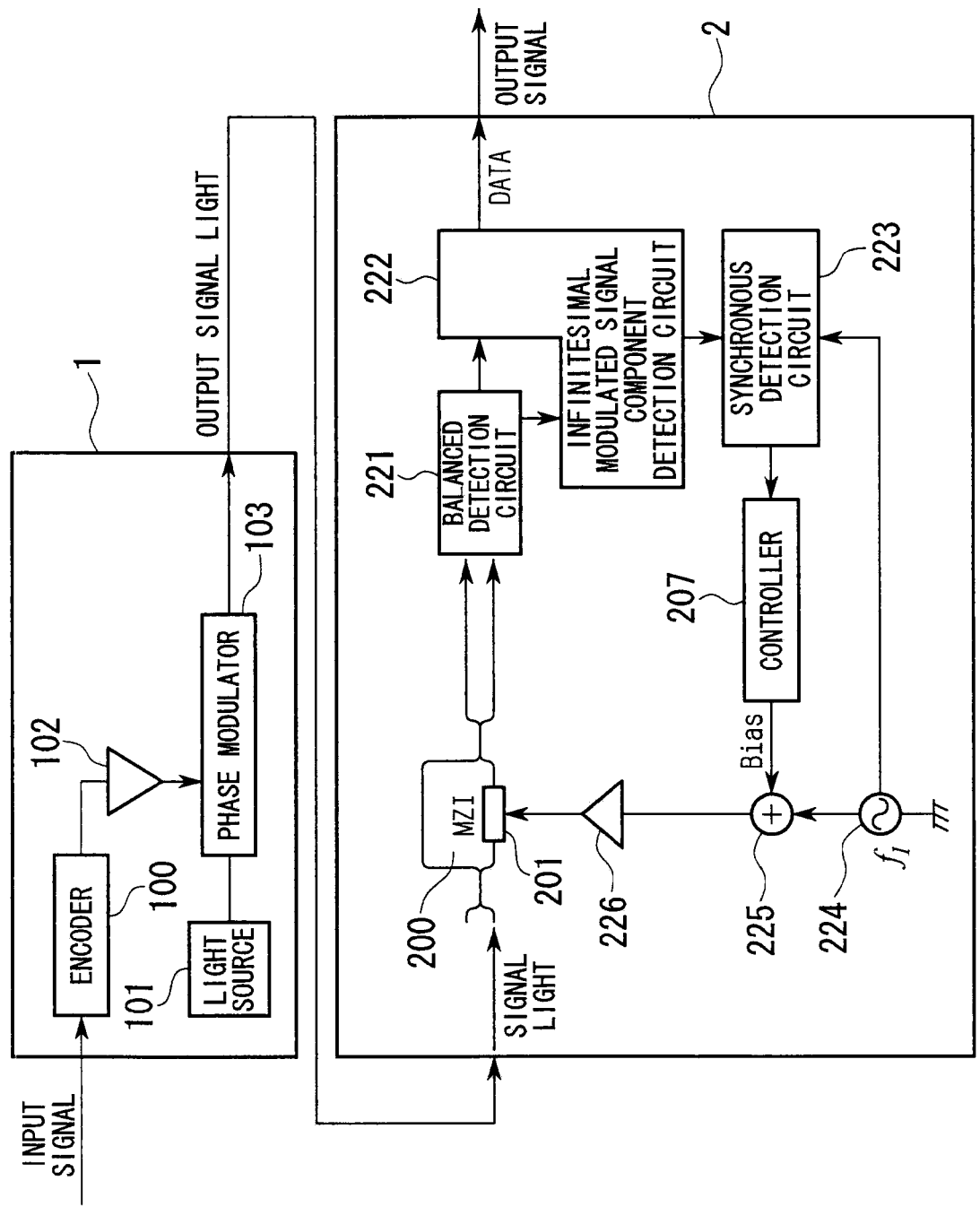
FIG. 1 is a block diagram showing the configuration of the optical transmission system according to a first embodiment of the present invention.

EXPLANATION OF THE REFERENCE SYMBOLS 1 optical transmitter, 2 optical receiver, 100 encoder, 101 light source, 102 modulator driving circuit, 103 phase modulator, 105 clock signal generation circuit, 106 oscillation circuit, 110 modulation state control circuit, 111 control signal communication circuit, 200 MZI (Mach-Zehnder interferometer) for DPSK code demodulation, 201 phase adjustment terminal, 202 balanced photodetector, 203 amplifier, 204 data regeneration circuit, 205 clock extraction circuit, 207 controller, 209 logic inversion circuit, 210 monitoring photodetector, 211 narrow-band amplifier, 212 differential circuit, 213 filter, 214 amplifier, 215 intensity modulator, 216 oscillation circuit, 217 optical amplifier, 218 oscillation circuit, 219 optical attenuator, 220 optical splitting circuit, 221 balanced detection circuit, 222 infinitesimal-modulated signal component detection circuit, 223 synchronous detection circuit, 224 infinitesimal-modulated signal oscillation circuit, 225 adder, 226 driver, 231 eye-opening monitoring circuit, 232 band pass filer, 241 error count monitoring circuit, 251 current consumption monitoring circuit, 252 transimpedance amplifier, 253 limiting amplifier, 254 resistor, 255 amplifier, 261 optical splitting circuit, 262 optical splitting circuit, 263 optical coupling circuit, 264 photodetector, 265 amplification circuit, 271 resistor, 272 amplification circuit, 273 resistor, 274 subtracter, 275 amplification circuit, 281 MZI warm-up detection circuit, 282 loop open/close switch, 284 lock detection circuit, 285 control circuit with loop re-locking function, 286 MZI temperature monitor, 287 comparator, 291 phase adjustment terminal, 292 infinitesimal-modulation operating point setting circuit, 293 driver, 294 MZI offset setting circuit, 295 optical carrier frequency detection circuit, 297 control signal communication circuit, 2080 power detection circuit, 2841 resistor, 2842 resistor, 2843 resistor, 2844 comparator, 2845 comparator, 2846 AND circuit, 2851 triangular wave generation circuit, 2852 amplifier, 2853 adder, 2854 switch, 2855 comparator, 2856 switch, 2857 integration circuit, 2858 resistor, 2859 resistor, C1 capacitor.

BEST MODE FOR CARRYING OUT THE INVENTION

Below, embodiments of the present invention are explained in detail, referring to the drawings. However, present invention is not limited to the embodiments explained below, and for example various constituent components of the embodiments may be combined as appropriate.

Prior to explaining embodiments of the present invention, a principle of present invention is explained referring to FIG. 10A through FIG. 10D, FIG. 11, and FIG. 12.

In resolving the first of the above-described issues, a low-frequency signal is applied to a phase shifter provided in an interferometer in order to detect the direction of shift between the signal light wavelength and the interferometer pass band, and the level or phase of this low-frequency signal is detected.

Figure 10:
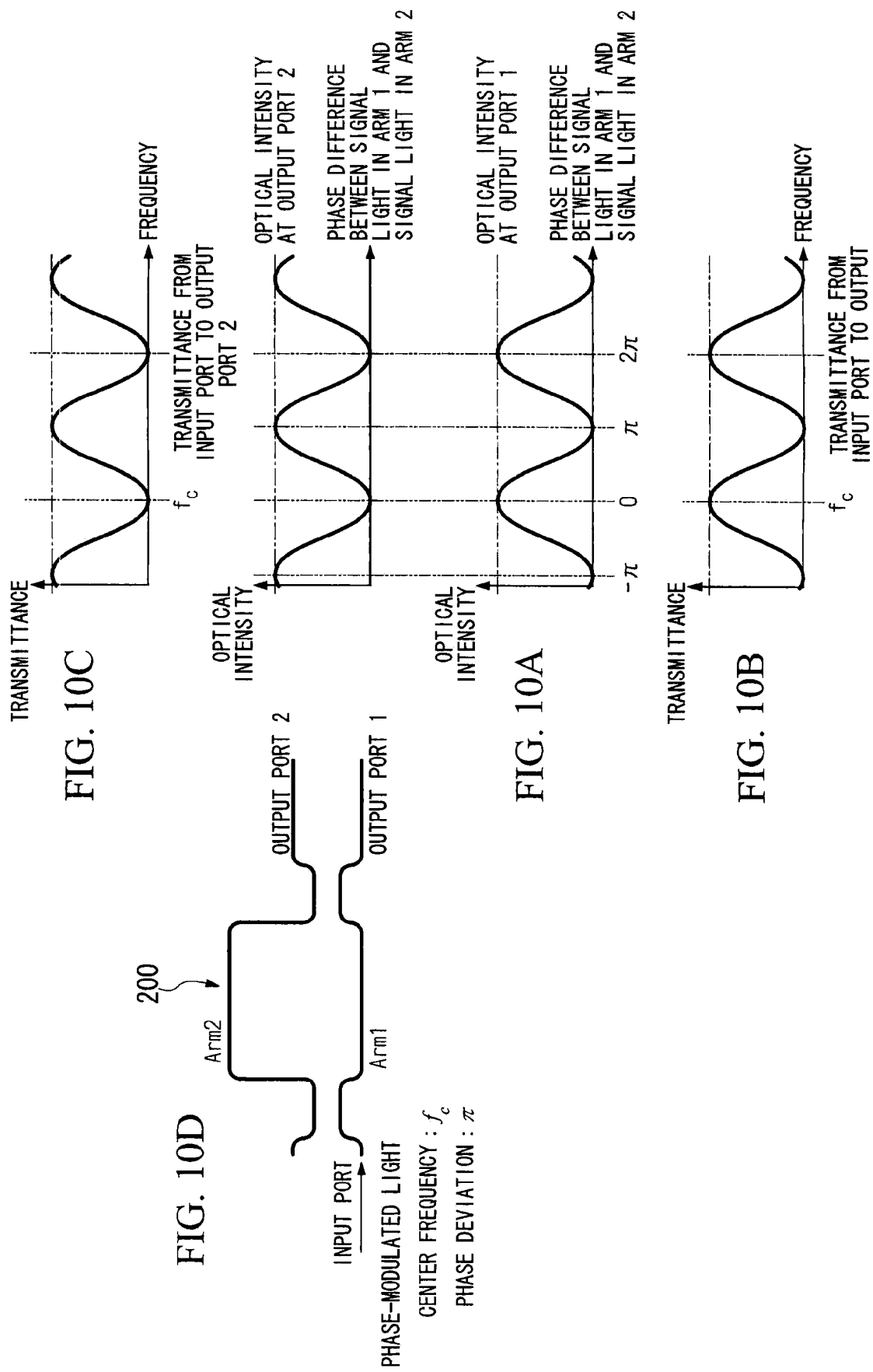
FIG. 10A shows the input/output characteristic of a Mach-Zehnder interferometer.
FIG. 10B shows the input/output characteristic of a Mach-Zehnder interferometer.
FIG. 10C shows the input/output characteristic of a Mach-Zehnder interferometer.
FIG. 10D shows the relation between the input/output ports and the two arms of a Mach-Zehnder interferometer.

FIG. 10A to FIG. 10C show the input/output characteristics of a Mach-Zehnder interferometer (hereafter abbreviated to "MZI") which converts phase-modulated light into intensity-modulated light. FIG. 10A shows the optical intensities at output ports 1 and 2 plotted against the phase differences of the light at arm 1 and arm 2. The upper side in FIG. 10A shows the intensity at output port 2, and the lower side shows the intensity at output port 1. FIG. 10B and FIG. 10C show the transmittance from the input port to the output ports 1 and 2 respectively as functions of the input light frequency. As shown in FIG. 10D, phase-modulated light input from the input port of the MZI 200 is split and provided to arm 1 and arm 2.

After applying a time slot's delay corresponding to the signal bit rate to arm 2, the light in the two arms is caused to interfere, and the result is output from an output port. At this time, the optical intensity output from the output port depends on the delay difference between the two arms. For example, when the phase difference is 0, the optical intensity at output port 1 is maximum, and when the phase difference is π or is −π, the intensity is minimum. That is, when the phase of the phase-modulated light is 0 continuously for two time slots, the output intensity from output port 1 is minimum, and when the phases are 0, π or π, 0 continuously for two time slots, the output intensity is maximum.

In other words, this point is the optimum operating point of the MZI. If for some reason the delay difference between the two arms is shifted from a phase difference of 0, the minimum value of the optical intensity is increased, and the maximum value is decreased. As a result, there is degradation of the photo-detection sensitivity of the optical receiver.

Here, the input/output characteristic of the MZI 200 in a frequency domain has a filter characteristic with repetition frequency equal to the signal bit rate. Upon performing adjustments such that the optical intensity is maximum when the phase difference between the two arms is 0, the frequency at which the MZI transmittance is greatest matches the center frequency of the signal light.

Figure 11:
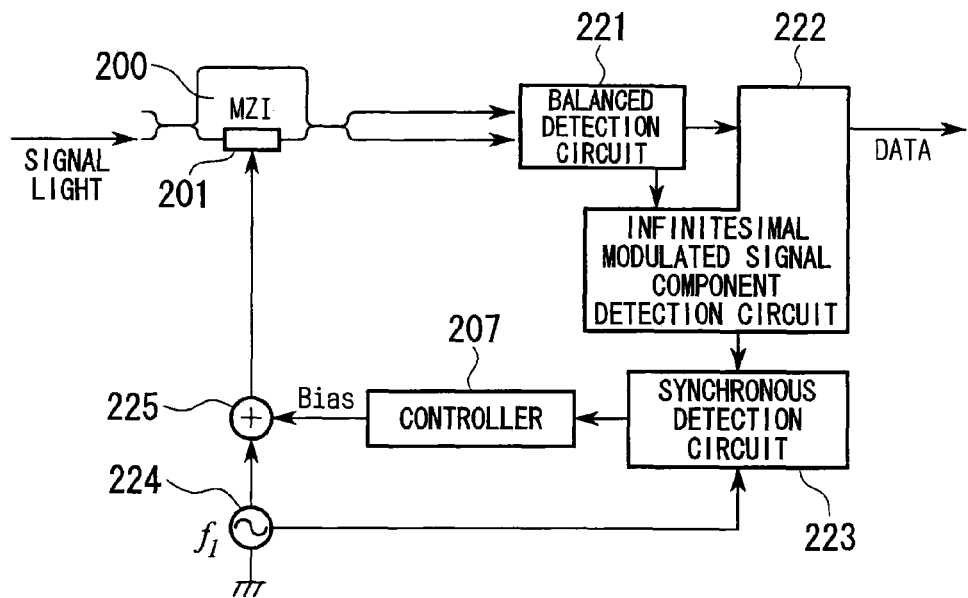
FIG. 11 is a block diagram showing the basic configuration of an optical receiver in an optical transmission system of the present invention.

FIG. 11 shows the basic configuration of an optical receiver in an optical transmission system according to the present invention. In the figure, the optical receiver has an MZI 200, phase adjustment terminal 201, balanced detection circuit 221, infinitesimal-modulated signal component detection circuit 222, synchronous detection circuit 223, infinitesimal-modulated signal oscillation circuit 224 which generates a low-frequency signal at frequency f1, and controller 207 which supplies a bias voltage to the phase adjustment terminal 201 via an adder 225. The synchronous detection circuit 223 may be a circuit which detects the amplitude and phase information such as a multiplier or mixer, or may be a circuit which detects phase information such as a phase comparator or phase detection circuit.

Figure 12:
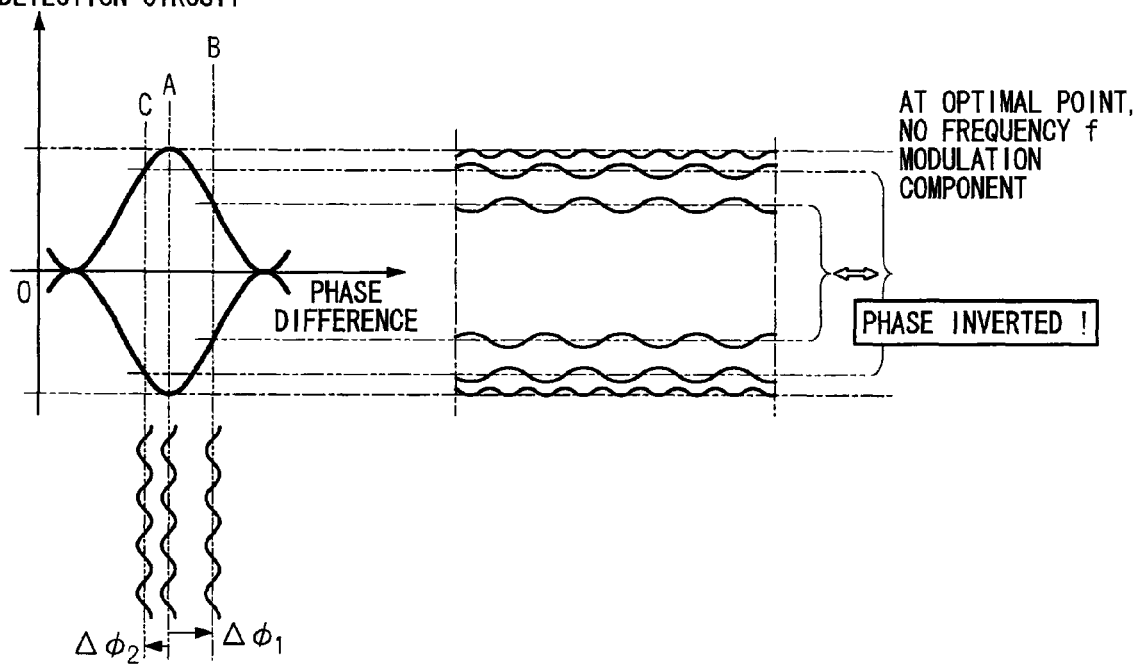
FIG. 12 explains the phase shift dependence of the balanced photodetector output.

The output signal of the balanced detection circuit 221 has maximum amplitude at the optimum operating point of the MZI for DPSK code demodulation (below simply "MZI") 200, as shown in FIG. 12. Upon applying a voltage (or current) to the phase adjustment terminal 201 provided in one arm of the MZI 200, the phase difference between arm 1 and arm 2 changes, and so the minimum and maximum values of the output light change.

Upon applying a low-frequency signal with frequency f1 to the phase adjustment terminal 201 from the infinitesimal-modulated signal oscillation circuit 224, at the optimum operating point (A in the figure) of the MZI 200, the maximum and minimum values fluctuate at twice the rate of the frequency f1. If for example the phase difference changes by Δφ1 to result in a shift to B in the figure, then the output voltage amplitude declines, and the signal with low frequency f1 is superposed.

Similarly when the phase difference changes to Δφ2 and the operating point shifts to C, the output voltage amplitude decreases and a low-frequency signal with frequency f1 is superposed; but it is seen that the phase is inverted compared with point B.

From the output of the balanced detection circuit 221, the infinitesimal-modulated signal component detection circuit 222 extracts the low-frequency signal with frequency f1 superposed thereupon, and using the low-frequency signal output from the infinitesimal-modulated signal oscillation circuit 224 which applies the low-frequency signal with frequency f1 to the phase adjustment terminal 201, the direction of the shift in operating point (in terms of the frequency domain, equivalent to the shift between the pass band of the MZI 200 and the center frequency of the transmitting-side light source) is detected through synchronous detection by the synchronous detection circuit 223, and the voltage (or current) applied to the phase adjustment terminal 201 of the MZI 200 is controlled.

In order to resolve the above-described second issue, a logic inversion circuit positioned in a stage beyond the discriminator, not shown, in the infinitesimal-modulated signal component detection circuit 222 is used to invert the logic of the received signal as necessary, in order to reduce the amount of fluctuation in the MZI pass band to ½ or less of that in the prior art.

In FIG. 10A to FIG. 10C, in the initial state with no phase control, if the MZI operating point is at position π, then it is necessary to either adjust the temperature of the MZI substrate, or to perform phase adjustment and cause the operating point to shift to a phase difference of 0. However, if the operating point is set at the point at which the phase difference between the outputs from the two arms of the MZI is π, this adjustment becomes unnecessary. However, in this case the logic of the output intensity-modulated signal is inverted. Hence if the logic of the signal after data discrimination and regeneration is again inverted, the original signal logic is restored.

First Embodiment

The optical transmission system of a first embodiment of the present invention is explained. The configuration of the optical transmission system of the first embodiment of the present invention appears in FIG. 1. In the figure, the optical transmission system includes an optical transmitter 1, which outputs differential-encoded, phase-modulated light, and an optical receiver 2, which detects the phase-modulated light transmitted from the optical transmitter 1 and performs demodulation.

The optical transmitter 1 has an encoder 100 which converts the NRZ code input signal into an NRZ-I (Inverted) code signal, a light source 101, a modulator driving circuit 102, and a phase modulator 103 which, for the marks and spaces encoded by the encoder 100, outputs phase-modulated light with the phase deviation $\Delta\phi$ in the range $0 \leq \Delta\phi \leq \pi$.

The optical receiver 2 has a Mach-Zehnder interferometer (MZI for DPSK code demodulation) 200 which splits the phase-modulated light received from the optical transmitter 1 into two beams, delays one of the split signal light beams by one bit, and causes both signal light beams to interfere to effect conversion into intensity-modulated light, and which has a phase adjustment terminal 201 capable of setting the phase difference between the interfering signals, as well as a balanced detection circuit 221 which performs photoelectric conversion of the signal light from the two output ports of the Mach-Zehnder interferometer 200 and outputs the difference between the converted electrical signals.

The optical receiver 2 also has an infinitesimal-modulated signal component detection circuit 222, synchronous detection circuit 223, controller 207, infinitesimal-modulated signal oscillation circuit 224, adder 225, and driver 226.

The infinitesimal-modulated signal component detection circuit 222 uses the signal output from the balanced detection circuit 221 to detect the infinitesimal-modulated signal (frequency f1) component applied to the phase adjustment terminal 201 of the Mach-Zehnder interferometer 200, and outputs this component to the synchronous detection circuit 223, and in addition discriminates and regenerates the data output from the balanced detection circuit 221, and outputs the discriminated and regenerated data as the output signal of the optical receiver 2.

The synchronous detection circuit 223, through synchronous detection of the infinitesimal-modulated signal detected by the infinitesimal-modulated signal component detection circuit 222 and the infinitesimal-modulated signal directly input from the infinitesimal-modulated signal oscillation circuit 224, detects the amplitude and phase of the infinitesimal-modulated signal component superposed on the optical signal passed by the Mach-Zehnder interferometer 200. The amplitude and phase here detected are an error signal component arising from a shift between the optical signal carrier frequency and the optical frequency characteristic of the Mach-Zehnder interferometer; a signal with this amplitude and phase is supplied to the controller 207 (in general, loop filter and PID control).

Based on the signal supplied by the synchronous detection circuit 223, the controller 207 outputs to the adder 225, as a bias signal, a control signal to adjust the phase difference in the two split signal light beams, so as to correct the above shift. The adder 225 adds the infinitesimal-modulated signal output from the infinitesimal-modulated signal oscillation circuit 224 to the bias signal, and outputs the addition signal to the driver 226. The driver 226 drives the phase adjustment terminal 201 of the Mach-Zehnder interferometer 200 based on this addition signal. A feedback loop acts so as to cause this error signal component to become zero, so that ultimately the optical signal carrier frequency matches a peak or bottom of the optical frequency characteristic of the Mach-Zehnder interferometer 200.

Second Embodiment

Figure 2:
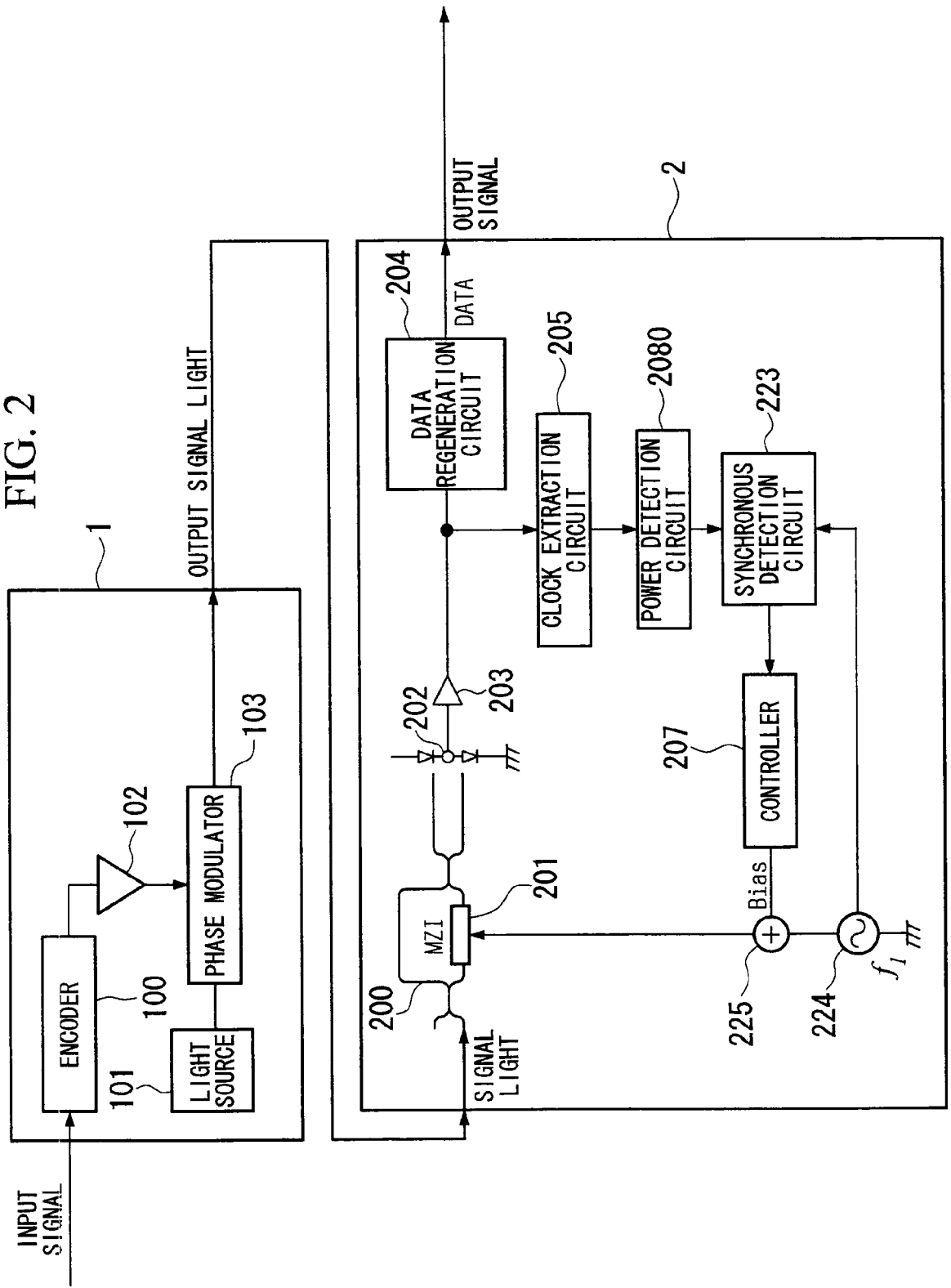
FIG. 2 is a block diagram showing the configuration of the optical transmission system according to a second embodiment of the present invention.

The optical transmission system of a second embodiment of the present invention is explained. FIG. 2 shows the configuration of the optical transmission system of the second embodiment of the present invention. Differences between the optical transmission system of this embodiment and the optical transmission system of the first embodiment are the fact that the balanced detection circuit 221 includes a balanced photodetector 202 and an amplifier 203, and that a circuit consisting of a data regeneration circuit 204, clock extraction circuit 205, and power detection circuit 2080 is given as a specific example of a circuit constituting the infinitesimal-modulated signal component detection circuit 222. Otherwise the configuration is the same as that of the optical transmission system of the first embodiment, and the same symbols are assigned to the same components. In FIG. 2, the driver 226 shown in FIG. 1 has been omitted.

Thus the optical receiver 2 has a balanced photodetector 202; amplifier 203 which amplifies the signal output from the balanced photodetector 202; data regeneration circuit 204 which discriminates and regenerates data from the output of the amplifier 203; clock extraction circuit 205 which extracts the clock from the signal train output from the balanced photodetector 202 via the amplifier 203; infinitesimal-modulated signal oscillation circuit 224 which applies a low-frequency signal with frequency f1 to the phase adjustment terminal 201 of the MZI 200; power detection circuit 2080 which, by detecting the power of the clock signal output from the clock extraction circuit 205, extracts the low-frequency signal with frequency f1 superposed on the clock signal; synchronous detection circuit 223 which compares the phases of the low-frequency signal with frequency f1 output from the power detection circuit 2080 and the low-frequency signal with frequency f1 output from the infinitesimal-modulated signal oscillation circuit 224, and detects the amount and direction of the shift between the center wavelength of the phase-modulated light output from the optical transmitter 1 and the pass band wavelength of the MSI 200; controller 207 which outputs to the adder 225 a control signal to adjust the phase difference between the two split signal light beams, so as to correct the shift amount; and adder 225 which adds the outputs of the infinitesimal-modulated signal oscillation circuit 224 and controller 207 and applies the result to the phase adjustment terminal 201.

The clock extraction circuit 205 must perform linear extraction so as to result in clock power proportional to the power of the clock component contained in the signal.

Third Embodiment

Figure 3:
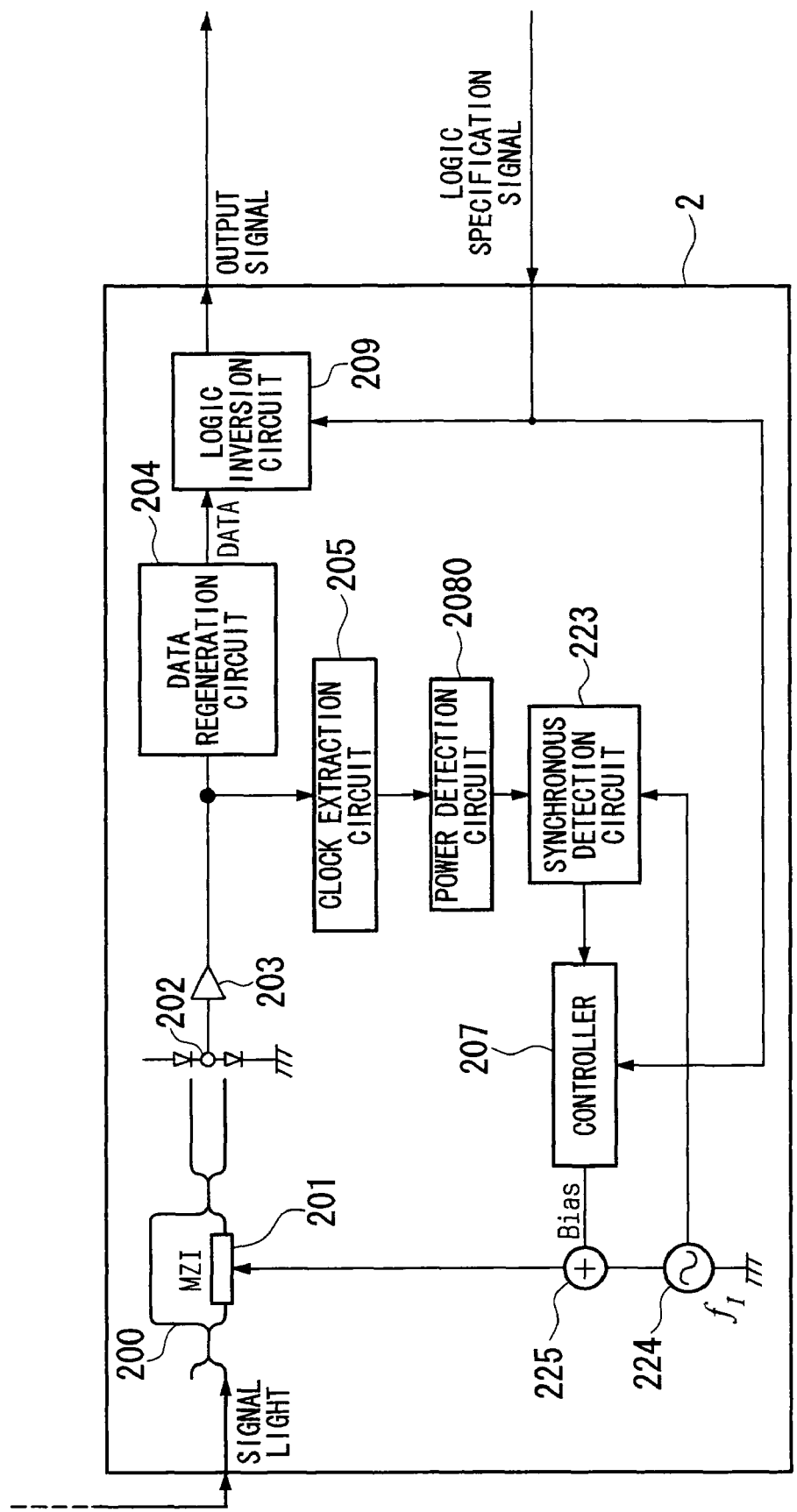
FIG. 3 is a block diagram showing the configuration of the optical transmission system according to a third embodiment of the present invention.

The optical transmission system of a third embodiment of the present invention is explained. The configuration of the optical transmission system of the third embodiment of the present invention is shown in FIG. 3. In terms of configuration, the optical transmission system of this embodiment differs from the optical transmission system of the second embodiment in that a logic inversion circuit 209 which performs logic inversion of signals according to a logic specification signal input from outside is added to a stage beyond the data regeneration circuit 204 of the optical receiver 2, and in that the logic specification signal is supplied to the controller 207; otherwise the configuration is the same as that of the optical transmission system of the second embodiment shown in FIG. 2, and so the same symbols are assigned to the same components and redundant explanations are omitted. Also, the optical transmitter 1 is omitted from the figure.

In FIG. 3, the data regeneration circuit 204 of the optical receiver 2 discriminates and regenerates the signal train output from the balanced photodetector 202, and the logic inversion circuit 209 inverts the logic of the output signal of the data regeneration circuit 204 based on the logic specification signal input from outside, that is, performs inversion as necessary, and outputs the result.

The logic specification signal input from outside functions to cause the logic inversion circuit 209 to selectively output either the output signal of the data regeneration circuit 204, or the signal resulting from logic inversion by the logic inversion circuit 209; the functional portion for output of this signal may be provided within the optical receiver. This logic specification signal, or the functional portion which generates this logic specification signal, are equivalent to the selection unit in this invention.

By having the logic inversion circuit 209 perform logic inversion as necessary, the amount of correction of the shift between the center wavelength of the phase-modulated light output from the optical transmitter 1 and the pass band wavelength of the Mach-Zehnder interferometer 200 can be made ½ or less than the repetition frequency of the MZI 200, even when the pass band of the MZI 200 is maximum or minimum at the center wavelength of the phase-modulated light output from the optical transmitter 1.

The logic inversion circuit 209 can easily be configured as an EXOR (Exclusive OR) circuit. The logic specification signal is input from outside, but a method may also be used in which the logic specification signal is generated by detecting frame information in the output signal of the optical receiver 2 and judging the logic to be specified automatically; or, a command or similar may be input manually.

As explained above, the logic specification signal is also input to the controller 207, and when logic inversion is necessary the polarity of the bias voltage applied to the phase adjustment terminal 201 must be inverted (or, the direction of the bias current being passed must be inverted).

In FIG. 3, a case of application to the second embodiment is shown; but application to other embodiments is also possible.

Fourth Embodiment

Figure 4:
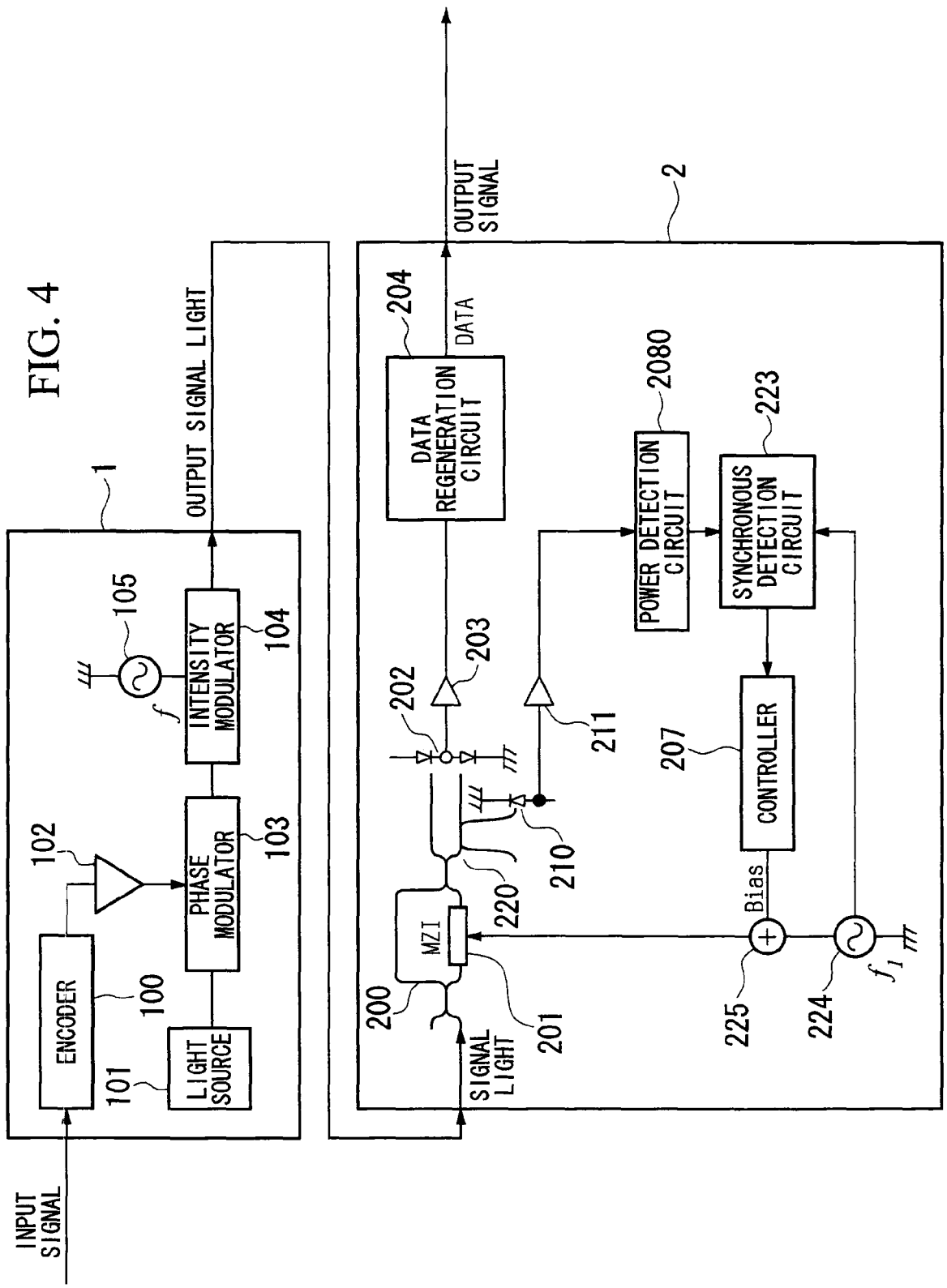
FIG. 4 is a block diagram showing the configuration of the optical transmission system according to a fourth embodiment of the present invention.

The optical transmission system of a fourth embodiment of the present invention is explained. The configuration of the optical transmission system of the fourth embodiment of the present invention is shown in FIG. 4. In terms of configuration, the optical transmission system of this embodiment differs from the optical transmission system of the second embodiment in that the optical transmitter 1 is provided with a clock signal generation circuit 105 which generates a clock signal with the signal bit rate and an intensity modulator 104 which performs intensity modulation using the clock signal output by the clock signal generation circuit 105; in that, in place of the clock extraction circuit, the optical receiver 2 is provided with an optical splitting circuit 220 which splits one of the ports among the two output ports of the MZI 200, a monitoring photodetector 210 connected to the optical splitting circuit 220, and a narrow-band amplifier 211 which extracts the clock with low-frequency signal at frequency f1 superposed from the intensity-modulated light output from the monitoring photodetector 210; and in that, based on the output signal of the narrow-band amplifier 211, the power detection circuit 2080 extracts the low-frequency signal at frequency f1 superposed on the clock, and based on the output of the power detection circuit 2080, the synchronous detection circuit 223 detects the shift amount and direction between the center wavelength of the phase-modulated light output from the optical transmitter 1 and the pass band wavelength of the MZI 200. Otherwise, the configuration is the same as that of the optical transmission system of the second embodiment shown in FIG. 2, and so the same symbols are assigned to the same components, and redundant explanations are omitted.

By having the intensity modulator 104 provided in the optical transmitter 1 perform intensity modulation using the clock signal output from the clock signal generation circuit 105, an RZ-DPSK signal is generated.

Through intensity modulation of the phase-modulated light on the side of the optical transmitter 1, the clock extraction circuit in the optical receiver 2 can be simplified. The modulation code of optical signals generated on the side of the optical transmitter 1 may also be CSRZ-DPSK.

Fifth Embodiment

Figure 5:
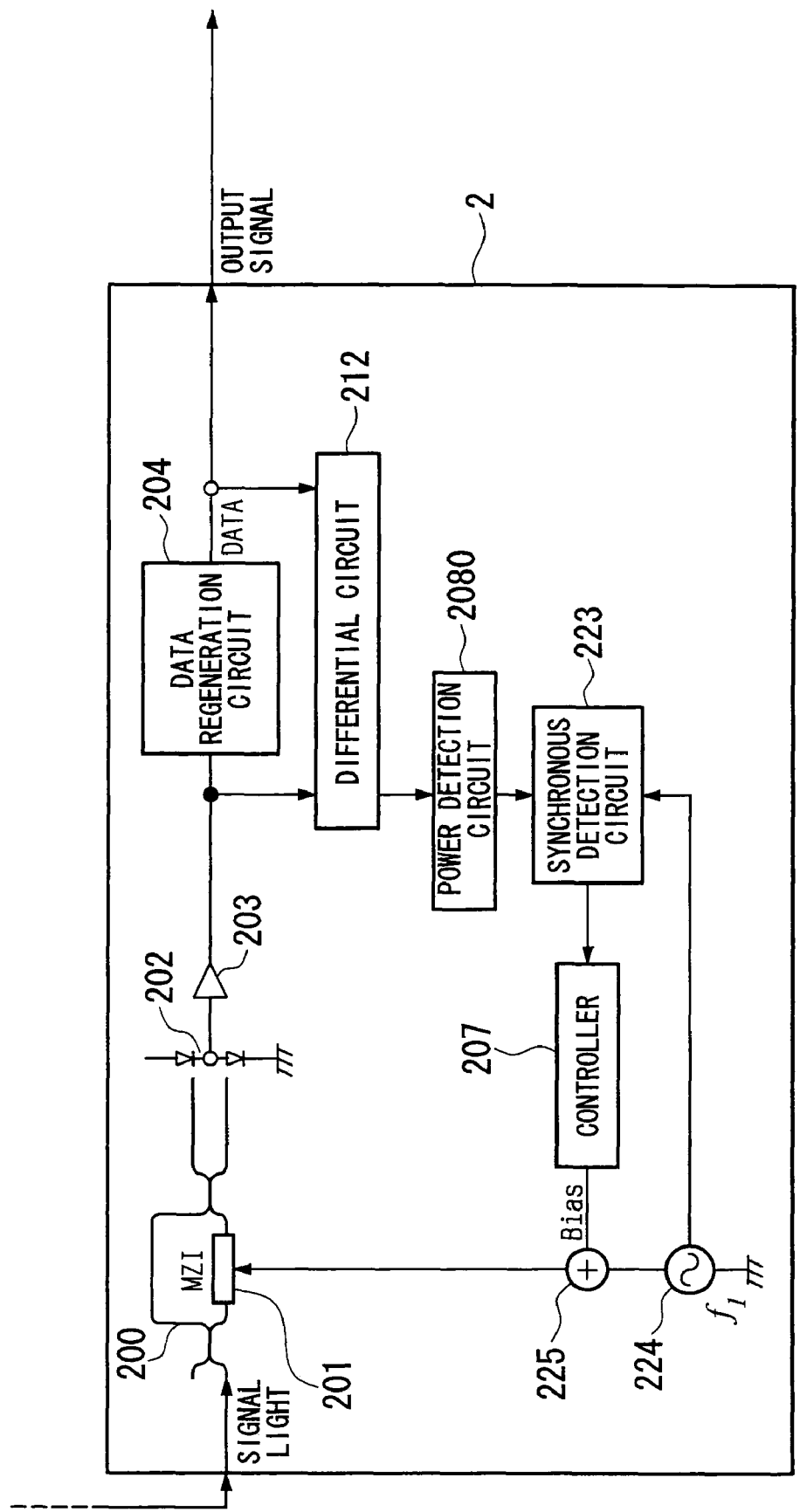
FIG. 5 is a block diagram showing the configuration of the optical transmission system according to a fifth embodiment of the present invention.

The optical transmission system of a fifth embodiment of the present invention is explained. The configuration of the optical transmission system of the fifth embodiment of the present invention is shown in FIG. 5. In terms of configuration, the optical transmission system of this embodiment differs from the optical transmission system of the second embodiment in that, in the optical receiver 2, a differential circuit 212 is provided in place of the clock extraction circuit 205 to detect the correlation, that is, the difference between, the output signal of the data regeneration circuit 204 and the signal before data discrimination; otherwise, the configuration is the same as that of the optical transmission system of the second embodiment shown in FIG. 2, and so the same symbols are assigned to the same components, and redundant explanations are omitted. The differential circuit 212 is equivalent to the correlation detection circuit of the present invention. The optical transmitter 1 is omitted from the figure.

Instead of synchronously detecting and extracting the low-frequency signal at frequency f1 superposed on the clock signal output from the clock extraction circuit 205 in the second embodiment, the differential circuit 212 determines the correlation between the data signal before discrimination and regeneration by the data regeneration circuit 204 and the data signal after discrimination and regeneration, and the power detection circuit 2080 extracts the low-frequency signal at frequency f1 from the output of the differential circuit 212; based on the output of the power detection circuit 2080, the synchronous detection circuit 223 detects the amount and direction of the shift between the center wavelength of the phase-modulated light from the optical transmitter 1 and the pass band wavelength of the MZI 200.

The data signal before data discrimination and regeneration in the data regeneration circuit 204 has a low frequency f1 superposed, but the data signal after discrimination and regeneration does not have a low frequency superposed, and so by detecting this difference in the differential circuit 212, it is possible to detect only the low-frequency component.

Sixth Embodiment

Figure 6:
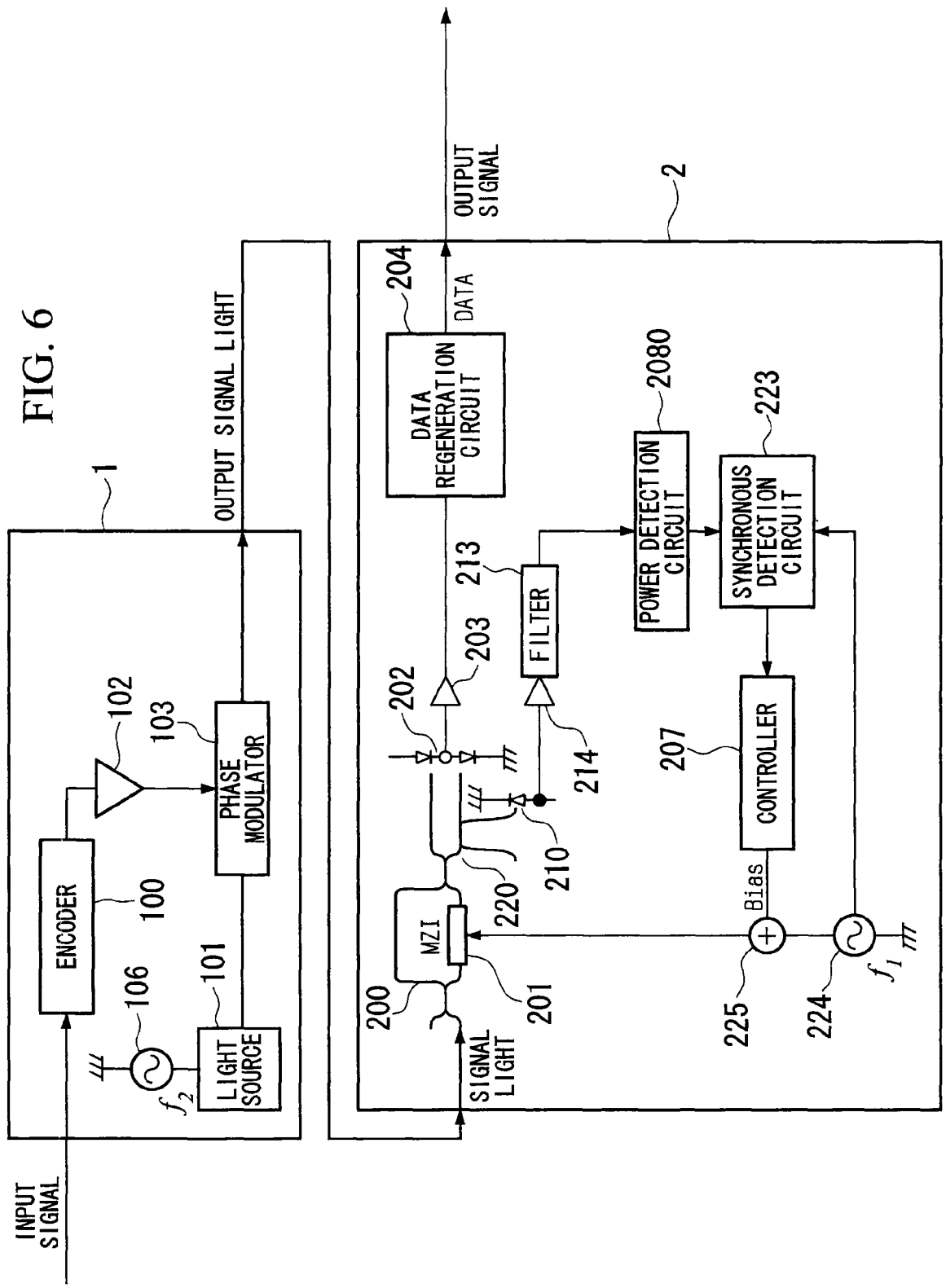
FIG. 6 is a block diagram showing the configuration of the optical transmission system according to a sixth embodiment of the present invention.

The optical transmission system of a sixth embodiment of the present invention is explained. The configuration of the optical transmission system of the sixth embodiment of the present invention is shown in FIG. 6. In terms of configuration, the optical transmission system of this embodiment differs from the optical transmission system of the second embodiment in that the optical transmitter 1 is provided with an oscillation circuit 106 which generates a signal at a frequency f2 sufficiently high to enable superpositioning of the low-frequency signal at frequency f1 which directly intensity-modulates the light source 101, and moreover, in place of the clock extraction circuit 205, the optical receiver 2 is provided with an optical splitting circuit 220 which splits one of the ports among the two output ports in the MZI 200, a monitoring photodetector 210 connected to the optical splitting circuit 220, and an amplifier 214 and a filter 213 which extract the component at frequency f2 superposed on the low-frequency signal at the frequency f1 from the intensity-modulated light output from the monitoring photodetector 210. Otherwise, the configuration is the same as that of the optical transmission system of the second embodiment shown in FIG. 2, and so the same symbols are assigned to the same components, and redundant explanations are omitted.

The power detection circuit 2080, instead of synchronously detecting and extracting the low-frequency signal at frequency f1 superposed on the clock signal output from the clock extraction circuit 205 in the second embodiment, extracts the low-frequency signal at frequency f1 superposed on the component at frequency f2 output from the filter 213, and the synchronous detection circuit 223 detects the amount and direction of the shift between the center wavelength of the phase-modulated light output from the optical transmitter 1 and the pass band wavelength of the MZI 200, based on the output of the power detection circuit 2080.

The amplifier 214 and filter 213 are equivalent to the signal detection unit of the present invention.

Here, in the optical transmitter 1 the output of the light source 101 is intensity-modulated at frequency f2 by the output signal of the oscillation circuit 106. At this time, the frequency f2 must be sufficiently high to enable superpositioning of the low-frequency signal at frequency f1; and a frequency must be selected in a range above the low-range cutoff frequency of the optical amplifier positioned in the transmission path.

The frequency f1 is superposed by the MZI 200 of the optical receiver 2 onto the intensity-modulated component at frequency f2 superposed on the output signal light of the optical transmitter 1, and the result is output.

In the monitoring photodetector 210, optical signals split by one of the ports of the MZI 200 are detected, and after amplification by the amplifier 214 the signal at frequency f2 superposed thereupon is detected by the filter 213.

An advantage of this scheme is that there is no need to use a monitoring photodetector, later-stage amplifier, power detection circuit, synchronous detection circuit, or other products with excellent high-frequency characteristics.

The intensity-modulated component which has been intensity-modulated on the transmitting side is not output by the balanced photodetector 202, and so there is no large impact on signal regeneration in the data regeneration circuit 204. However, the levels of the two input signals to the balanced photodetector 202 must be made to match. In the optical transmission system shown in FIG. 6, a monitoring terminal is provided at one port, and so it is necessary to add a loss equivalent to the loss of this terminal to the other port as well.

Seventh Embodiment

Figure 7:
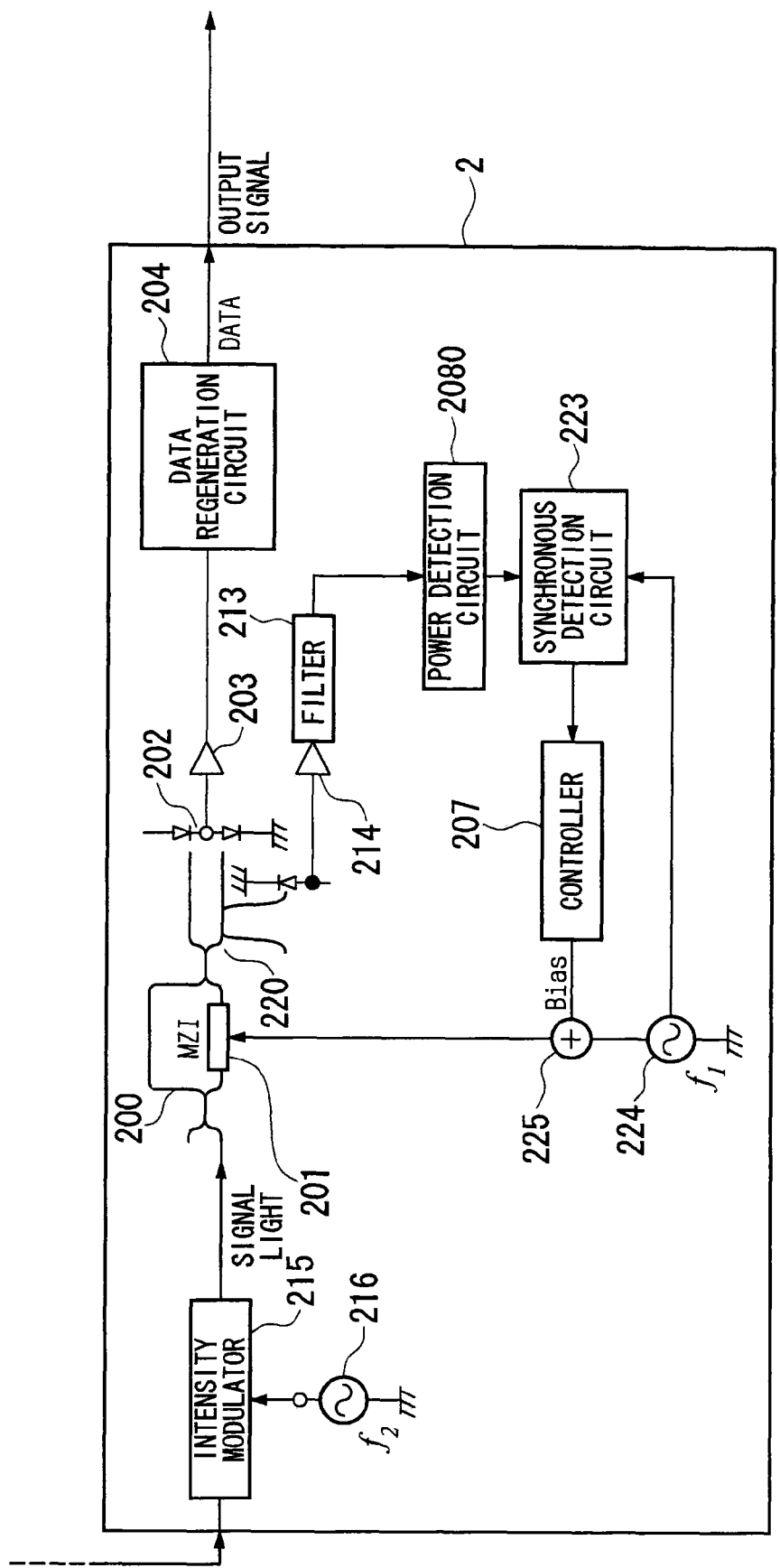
FIG. 7 is a block diagram showing the configuration of the optical transmission system according to a seventh embodiment of the present invention.

The optical transmission system of a seventh embodiment of the present invention is explained. The configuration of the optical transmission system of the seventh embodiment of the present invention is shown in FIG. 7. In terms of configuration, the optical transmission system of this embodiment differs from the optical transmission system of the sixth embodiment in that, in place of intensity modulation of the light source on the transmitting side, an oscillation circuit 216 which generates a signal at frequency f2 and an intensity modulator 215 which performs intensity modulation of the signal light using the output signal of the oscillation circuit 216 are provided in the optical receiver 2; otherwise, the configuration is the same as that of the optical transmission system of the sixth embodiment shown in FIG. 6, and so the same symbols are assigned to the same components, and redundant explanations are omitted. The optical transmitter 1 is omitted from the figure.

Here, the intensity modulator 215 is positioned in the input stage of the optical receiver 2, and performs intensity modulation using a signal at frequency f2 output from the oscillation circuit 216. This intensity modulator 215 may for example be a LN (Lithium Niobate) modulator, an AO (Acoust-Optic) modulator, or an electroabsorption optical modulator.

Eighth Embodiment

Figure 8:
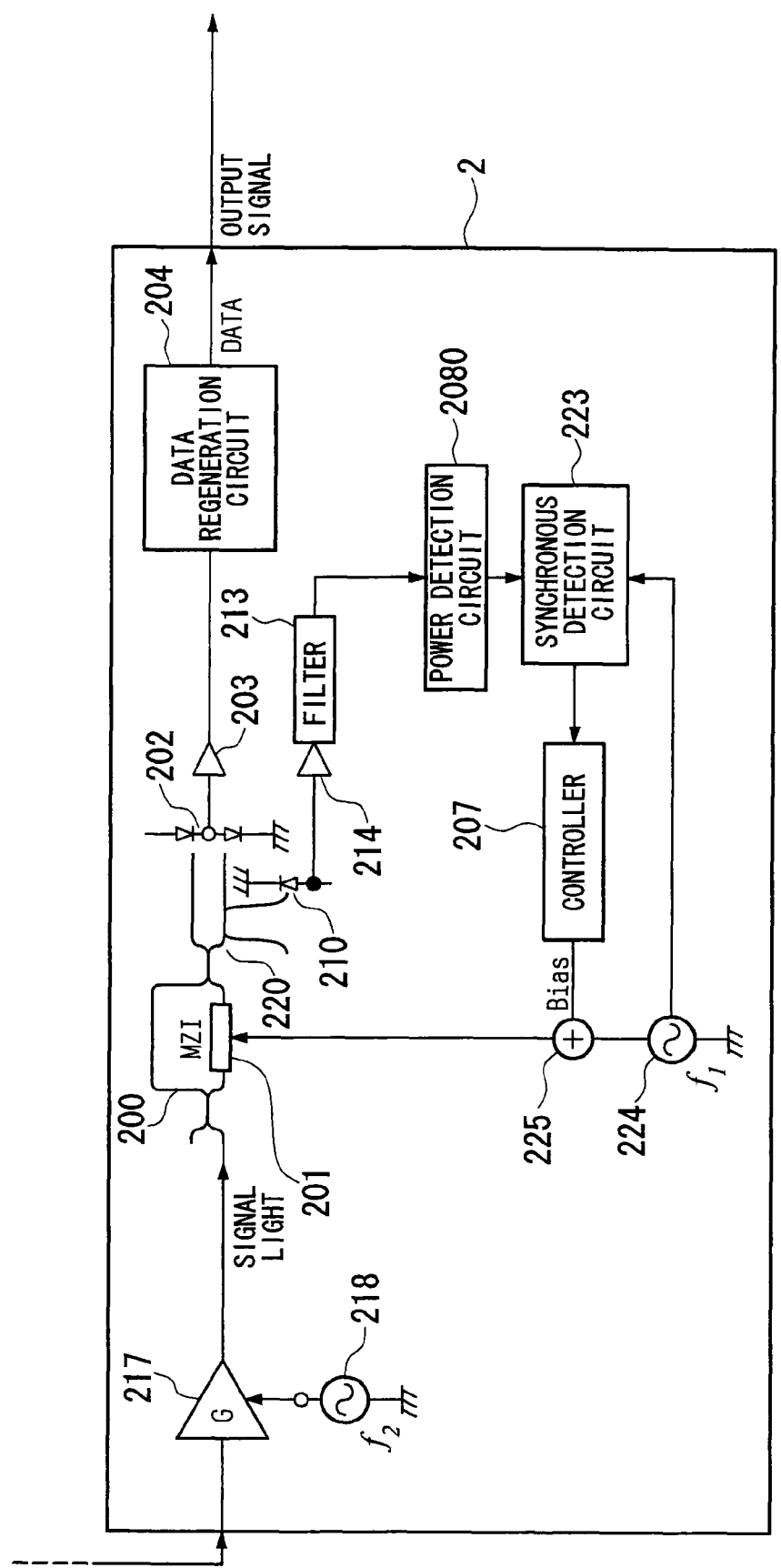
FIG. 8 is a block diagram showing the configuration of the optical transmission system according to an eighth embodiment of the present invention.

The optical transmission system of an eighth embodiment of the present invention is explained. The configuration of the optical transmission system of the eighth embodiment of the present invention is shown in FIG. 8. In terms of configuration, the optical transmission system of this embodiment differs from the optical transmission system of the seventh embodiment in that, in place of the intensity modulator 215 in the optical receiver 2, an optical amplifier 217 is provided, and the gain of the optical amplifier 217 is modulated at frequency f2 by an oscillation circuit 218 which generates a signal at frequency f2; otherwise, the configuration is the same as that of the optical transmission system of the seventh embodiment shown in FIG. 7, and so the same symbols are assigned to the same components, and redundant explanations are omitted. The optical transmitter 1 is omitted from the figure.

When a modulator is used, the SN ratio degradation due to the insertion loss poses a problem, and so in this embodiment the gain of an optical amplifier 217 is modulated. In particular, when using an optical amplifier, the ability to perform modulation using only a receiver amplifier is advantageous when considering application to WDM systems.

In both the seventh and the eighth embodiments, even if intensity modulation is performed an intensity-modulated component is not output by the balanced photodetector 202, and so there is no large impact on signal regeneration. However, the levels of the two input signals to the balanced photodetector 202 must be made to match. In the figures, a monitoring terminal is provided at one port, and so it is necessary to add a loss equivalent to the loss of this terminal to the other port as well.

Ninth Embodiment

Figure 9:
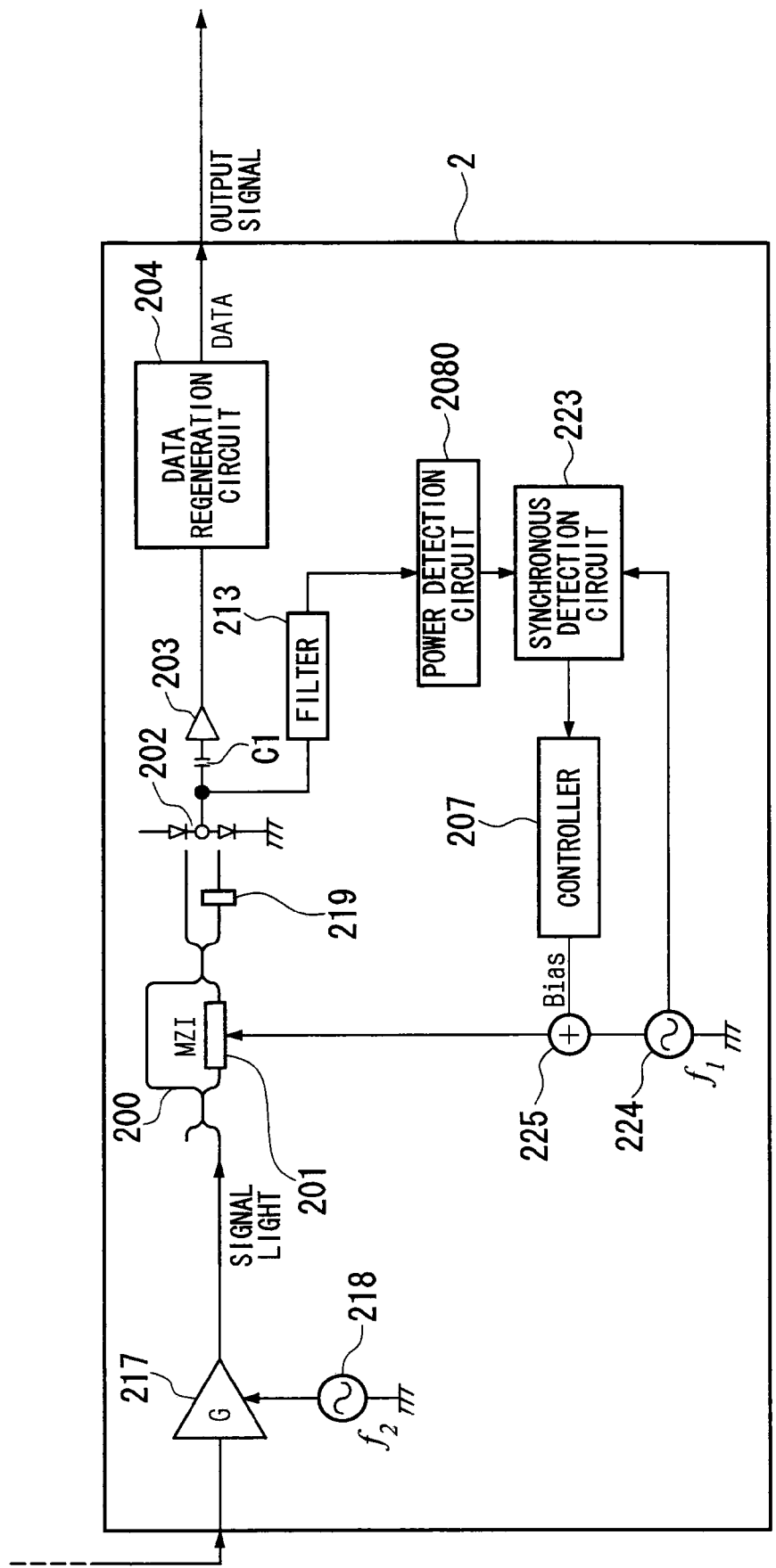
FIG. 9 is a block diagram showing the configuration of the optical transmission system according to a ninth embodiment of the present invention.

The optical transmission system of a ninth embodiment of the present invention is explained. The configuration of the optical transmission system of the ninth embodiment of the present invention is shown in FIG. 9. In terms of configuration, the optical transmission system of this embodiment differs from the optical transmission system of the eighth embodiment in that, in place of provision of the optical splitting circuit 220 and the monitoring photodetector 210, the optical receiver 2 is provided with input level adjustment unit, which renders asymmetrical the input levels of converted intensity-modulated light for input to the balanced photodetector 202; otherwise, the configuration is the same as that of the optical transmission system of the eighth embodiment shown in FIG. 8, and so the same symbols are assigned to the same components, and redundant explanations are omitted. The optical transmitter 1 is omitted from the figure.

On the side of the optical transmitter 1, or on the side of the optical receiver 2, signal light intensity-modulated at the frequency f2 is not output if the averaged signal power input to the two input ports of the balanced photodetector 202 is the same. In other words, if the averaged input power to one of the input ports is intentionally lowered, an intensity-modulated component can be detected.

In this embodiment, an optical attenuator 219 is connected to one of the input ports for this reason. The optical attenuator 219 is equivalent to the input level adjustment unit of the present invention.

The intensity-modulated component at frequency f2 detected by the balanced photodetector 202 is input to the power detection circuit 2080 via the filter 213, and is used in control of the MZI 200. A capacitor C1 is connected to the input terminal of the data regeneration circuit 204, and by blocking this intensity-modulated component, there is no large impact on the signal discrimination and regeneration in the data regeneration circuit 204.

In the above-described sixth through ninth embodiments, three different methods of intensity modulation at frequency f2 (direct intensity modulation of the light source in the optical transmitter 1, intensity modulation in the optical receiver 1 using an intensity modulator, and intensity modulation in the optical receiver 1 using an optical amplifier), as well as two methods of detection of the frequency f2 (monitoring of one of the ports of the MZI 200, connection of an optical attenuator 219 to one of the input ports of the balanced photodetector 202); however, configurations are not limited to those explained in the sixth through ninth embodiments, and the these methods may be freely combined.

Tenth Embodiment

Figure 13:
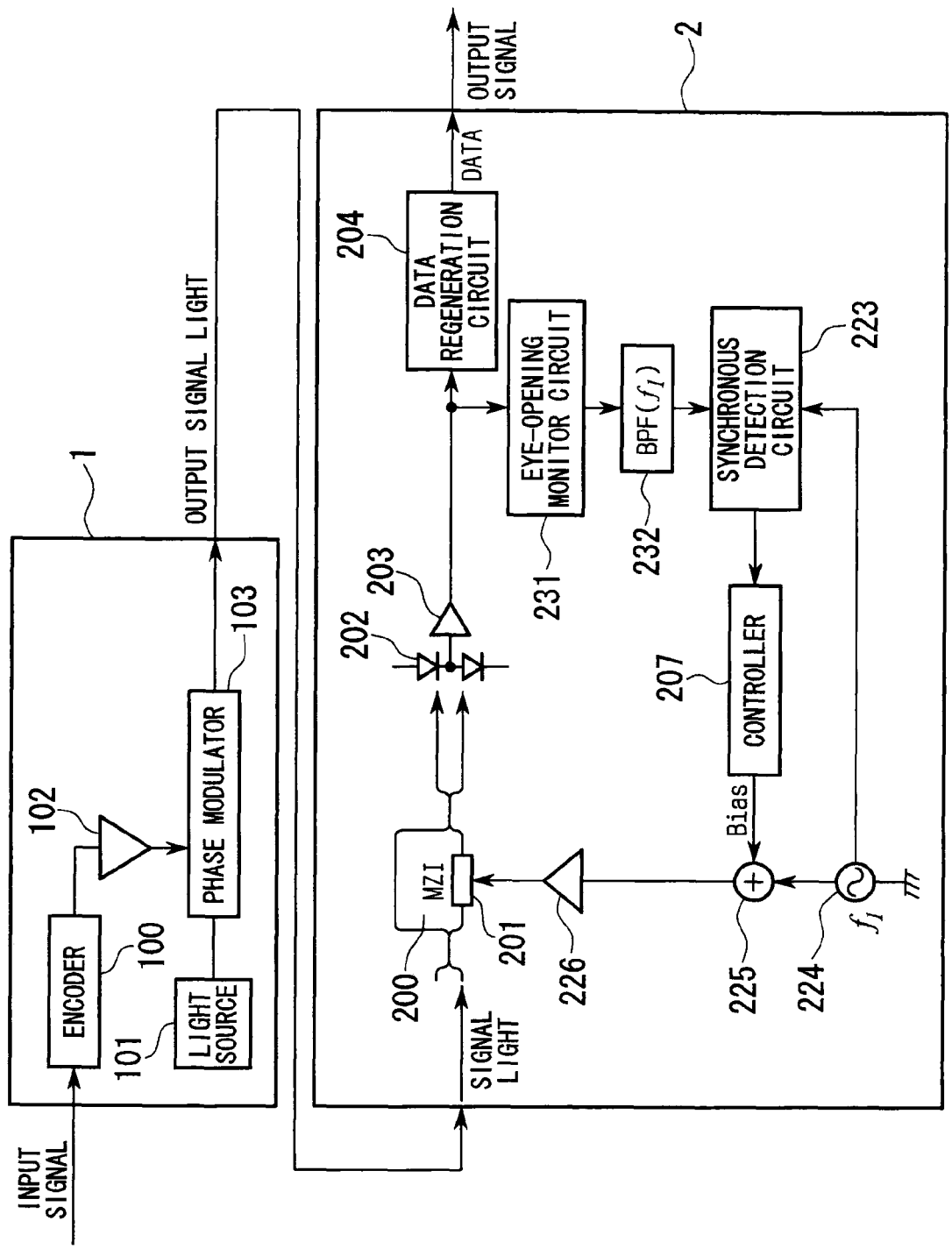
FIG. 13 is a block diagram showing the configuration of the optical transmission system according to a tenth embodiment of the present invention.

The optical transmission system of a tenth embodiment of the present invention is explained. The configuration of the optical transmission system of the tenth embodiment of the present invention is shown in FIG. 13. In terms of configuration, the optical transmission system of this embodiment differs from the optical transmission system of the first embodiment in that, similarly to for example FIG. 2, the balanced detection circuit 221 consists of a balanced photodetector 202 and an amplifier 203, and in that the infinitesimal-modulated signal component detection circuit 222 consists of a data regeneration circuit 204 which discriminates and regenerates data from the output of the amplifier 203, an eye-opening monitoring circuit 231 which monitors the opening of the eye pattern of the main signal output from the balanced detection circuit 221, and a band-pass filter 232 which passes the infinitesimal-modulated signal component (f1). Otherwise, the configuration is the same as that of the optical transmission system shown in FIG. 1, and so the same symbols are assigned to the same components, and redundant explanations are omitted.

When the signal light carrier frequency shifts from the peak or bottom of the optical frequency characteristic of the Mach-Zehnder interferometer 200, the amplitude of the main signal detected by the balanced photodetector 202 and output from the amplifier 203 is reduced, or, the S/N ratio is degraded. Hence by monitoring the eye opening of the main signal in the eye-opening monitoring circuit 231, and by extracting the infinitesimal-modulated signal component (f1) using the band-pass filter 232, the amplitude and phase of the infinitesimal-modulated signal component superposed on the optical signal passed by the Mach-Zehnder interferometer 200 can be detected. Through synchronous detection of this signal by the synchronous detection circuit 223 an error signal can be extracted, and this error signal can be fed back to enable locking on the desired state.

The most important advantage of this embodiment is the ability to always stabilize operation at the point at which the eye opening is maximum.

Eleventh Embodiment

Figure 14:
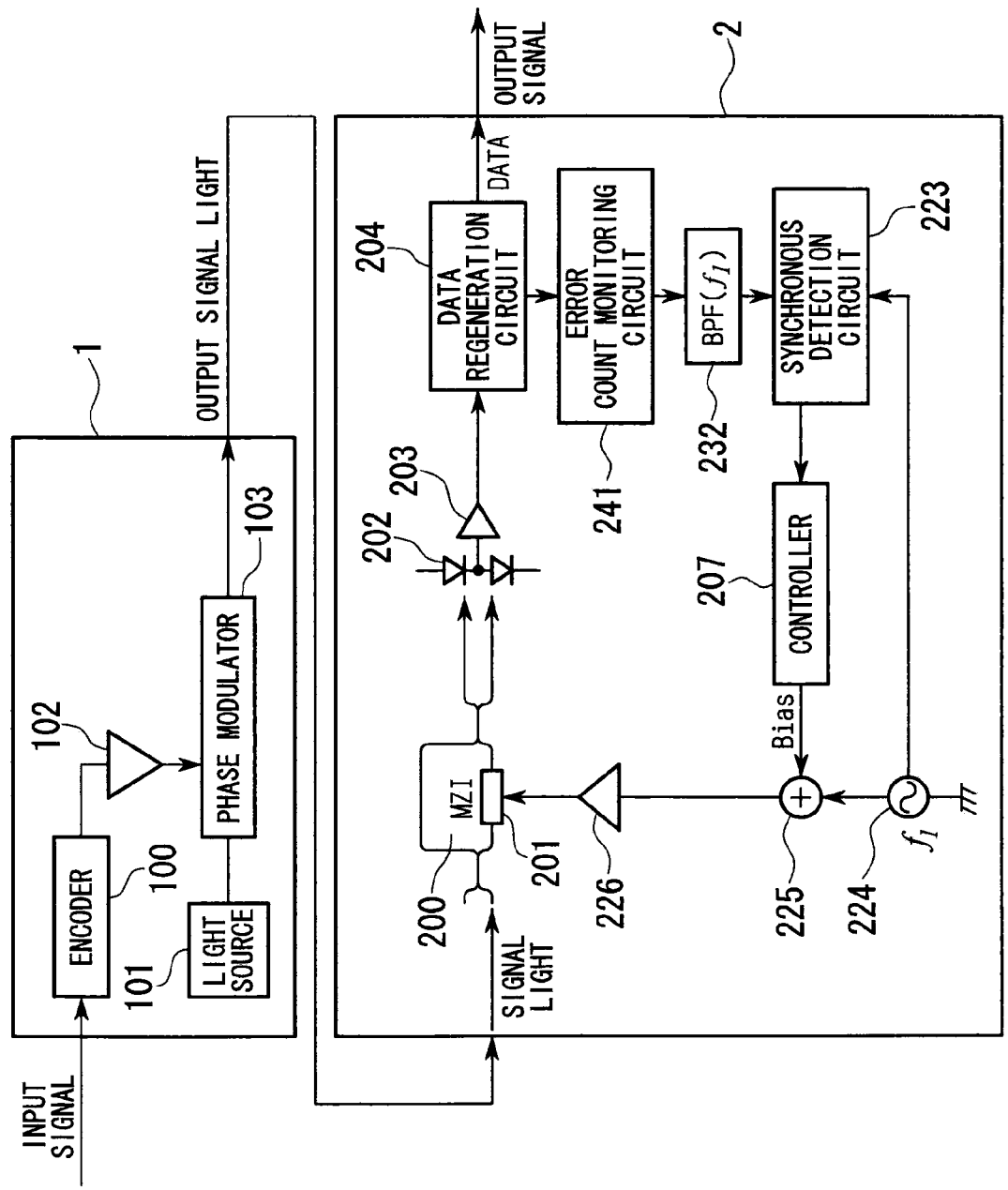
FIG. 14 is a block diagram showing the configuration of the optical transmission system according to an eleventh embodiment of the present invention.

The optical transmission system of an eleventh embodiment of the present invention is explained. The configuration of the optical transmission system of the eleventh embodiment of the present invention is shown in FIG. 14. In terms of configuration, the optical transmission system of this embodiment differs from the optical transmission system of the first embodiment in that the balanced detection circuit 221 consists of a balanced photodetector 202 and an amplifier 203, and in that the infinitesimal-modulated signal component detection circuit 222 consists of a data regeneration circuit 204, which discriminates and regenerates data from the output of the amplifier 203 and also provides code error detection functions, an error count monitoring circuit 241 which monitors the number of errors, and a band-pass filter 232 as shown in FIG. 13. Otherwise, the configuration is the same as that of the optical transmission system shown in FIG. 1, and so the same symbols are assigned to the same components, and redundant explanations are omitted.

When the signal light carrier frequency shifts from the peak or bottom of the optical frequency characteristic of the Mach-Zehnder interferometer, code errors occur in the data regenerated by the data regeneration circuit 204. Hence by using the error count monitoring circuit 241 to monitor the number of code errors, and by extracting the infinitesimal-modulated signal component (f1) using the band-pass filter 232, the amplitude and phase of the infinitesimal-modulated signal component superposed on the optical signal passed by the Mach-Zehnder interferometer 200 can be detected. By synchronously detecting this signal using the synchronous detection circuit 232, the error signal component can be extracted, and by feeding back this error signal component, it is possible to lock on the desired state.

In the above explanation, the number of code errors was used; in place of this, the number of code errors corrected may be used.

The most important advantage of this embodiment is the ability to always stabilize operation at the point at which the code error rate is minimum.

Twelfth Embodiment

Figure 15:
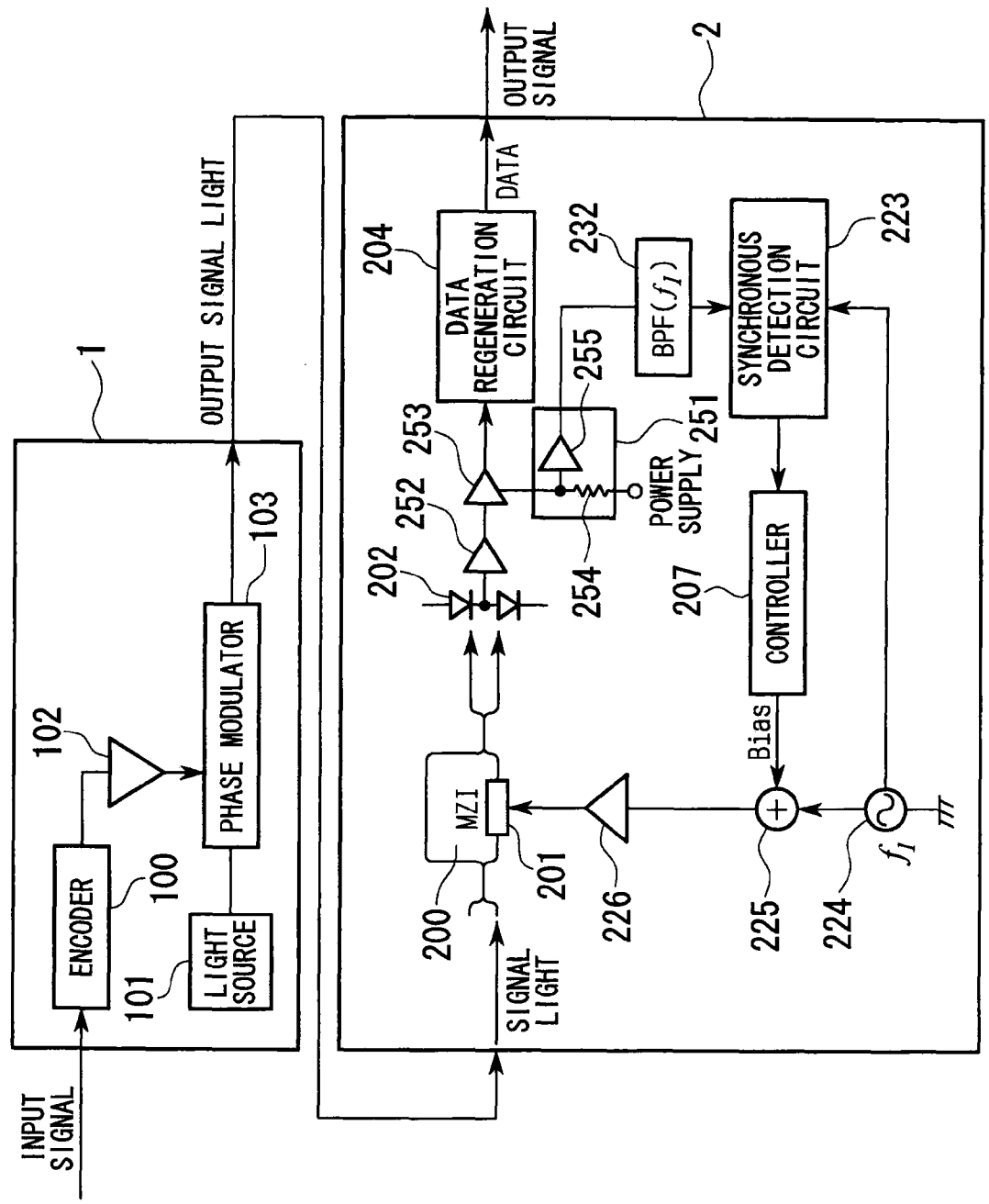
FIG. 15 is a block diagram showing the configuration of the optical transmission system according to a twelfth embodiment of the present invention.

The optical transmission system of a twelfth embodiment of the present invention is explained. The configuration of the optical transmission system of the twelfth embodiment of the present invention is shown in FIG. 15. The optical transmission system of this embodiment differs from the optical transmission system of the first embodiment in that the balanced detection circuit 221 consists of an equalizing amplification circuit, which is equivalent to the balanced photodetector 202 and amplifier 203, and in that the infinitesimal-modulated signal component detection circuit 222 consists of a data regeneration circuit 204, which discriminates and regenerates data from the output of the equalizing amplification circuit, a current consumption monitoring circuit 251, which monitors the current consumption of the equalizing amplification circuit constituting the balanced detection circuit 221, and the band-pass filter 232 shown in FIG. 13.

An equalizing amplification circuit generally consists of a transimpedance amplifier (TIA) 252 and a limiting amplifier (LIM) 253. The current consumption monitoring circuit 251 consists of a resistor 254 inserted between the power supply terminal of the limiting amplifier 253 and the power supply, and an amplifier 255 which amplifies and outputs the voltage at this power supply terminal. Otherwise, the configuration is the same as that of the optical transmission system shown in FIG. 13, and so the same symbols are assigned to the same components, and redundant explanations are omitted.

When the carrier frequency of the signal light shifts from the peak or bottom of the optical frequency characteristic of the Mach-Zehnder interferometer 200, the amplitude of the main signal input to the equalizing amplification circuit is reduced. The transistor amplification circuit constituting the equalizing amplification circuit is generally such that the current value flowing in the transistor is asymmetric when the input signal voltage (current) deviates in the positive direction and in the negative direction; hence the current consumption differs depending on the amplitude of the input signal to the transistor amplification circuit.

Hence the current consumption monitoring circuit 251 is used to monitor current consumption in the equalizing amplification circuit, and by extracting the infinitesimal-modulated signal component (f1) using the band-pass filter 232, the amplitude and phase of the infinitesimal-modulated signal component superposed on the optical signal passed by the Mach-Zehnder interferometer 200 can be detected. By synchronous detection of this signal using the synchronous detection circuit 223 the error signal component can be extracted, and by feeding back this error signal component, it is possible to lock on the desired state.

The most important advantage of this embodiment is the ability to detect the main signal peak without having to use main signal splitting, which has a large impact on the main signal.

Thirteenth Embodiment

Figure 16:
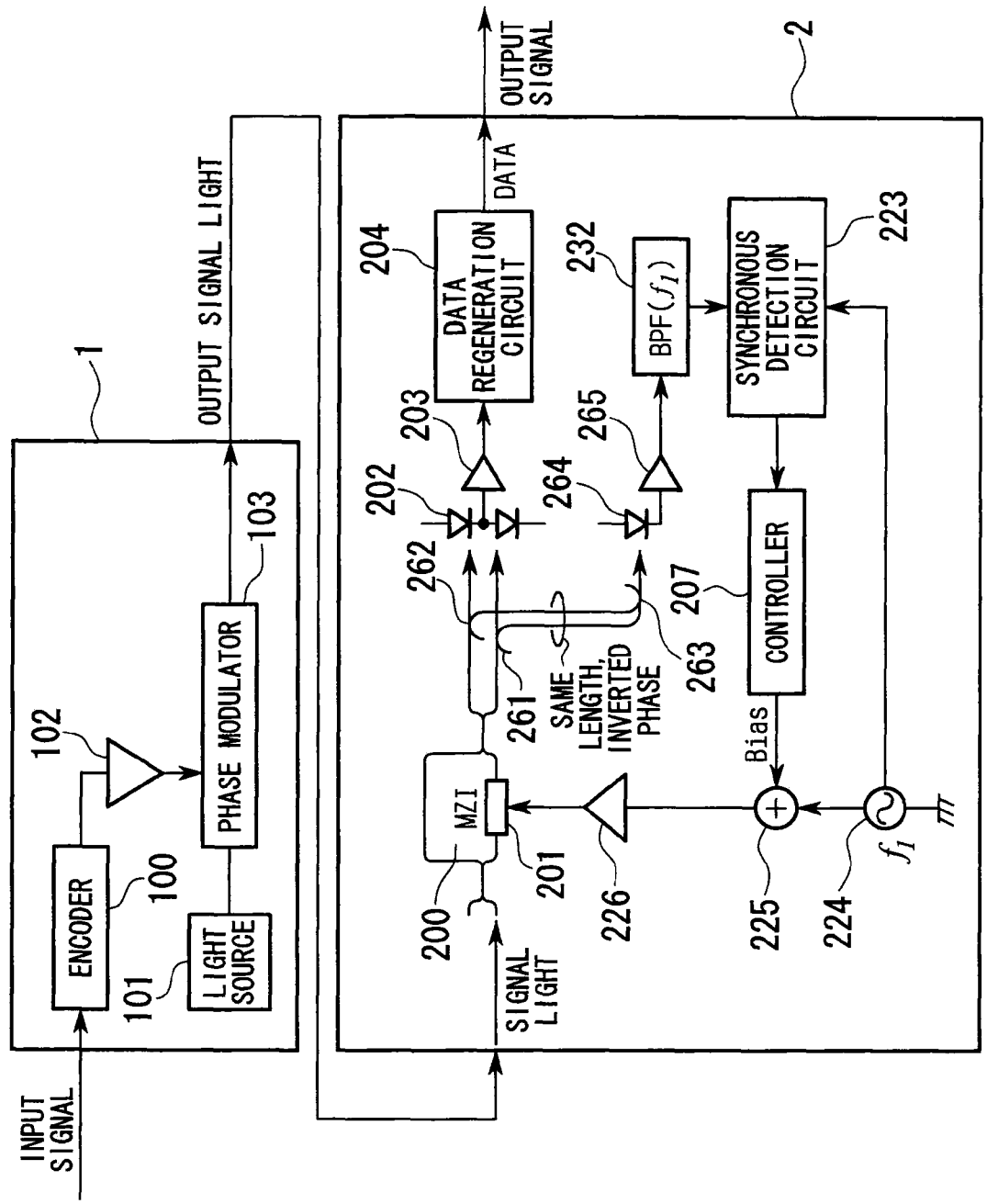
FIG. 16 is a block diagram showing the configuration of the optical transmission system according to a thirteenth embodiment of the present invention.

The optical transmission system of a thirteenth embodiment of the present invention is explained. The configuration of the optical transmission system of the thirteenth embodiment of the present invention is shown in FIG. 16. The optical transmission system of this embodiment differs from the optical transmission system of the first embodiment in the following respects.

The balanced detection circuit 221 consists of optical splitting circuits 261 and 262 provided on each of the two output arms of the Mach-Zehnder interferometer 200; an optical coupling circuit 263 which couples the two optical signals split by the splitting circuits; a balanced photodetector 202; an amplifier 203; a photodetector 264 which detects light coupled by the optical coupling circuit 263; and an amplification circuit 265 which amplifies the electrical signals output from the photodetector 264.

Also, the infinitesimal-modulated signal component detection circuit 222 consists of a data regeneration circuit 204, which discriminates and regenerates data from the output of the amplifier 203, and a band-pass filter 232 which passes the infinitesimal-modulated signal component (f1) output from the amplification circuit 265. Here, the light in the two optical paths which are split and then recoupled have equal bit lengths but are opposite in optical phase. Otherwise, the configuration is the same as that of the optical transmission system shown in FIG. 1, and so the same symbols are assigned to the same components, and redundant explanations are omitted.

When the carrier frequency of the signal light shifts from the peak or bottom of the optical frequency characteristic of the Mach-Zehnder interferometer 200, light output from the two output ports of the Mach-Zehnder interferometer 200 has the peak power reduced at marks and increased at spaces. By causing these two optical signals to interfere with equal lengths and opposite phases using the optical splitting circuits 261 and 262 as well as the optical coupling circuit 263, when the signal light carrier frequency shifts from the peak or bottom of the optical frequency characteristic of the Mach-Zehnder interferometer 200, light with peak power reduced on the mark side is made to interfere, with opposite phases, with light with peak power increased on the space side, so that the peak power and averaged power of the light after interference can be reduced. This power fluctuation is detected by a photodetector 264, and by extracting the infinitesimal-modulated signal component (f1) using the band-pass filter 232 via the amplification circuit 265, the amplitude and phase of the infinitesimal-modulated signal component superposed on the optical signal passed by the Mach-Zehnder interferometer 200 can be detected. By synchronously detecting this signal using the synchronous detection circuit 223 the error signal component can be extracted, and by feeding back this error signal component, it is possible to lock on the desired state.

The most important advantage of this embodiment is the ability to detect the infinitesimal-modulated signal component using a comparatively slow (f1) photodetector, without performing main signal splitting in the electrical domain.

Fourteenth Embodiment

Figure 17:
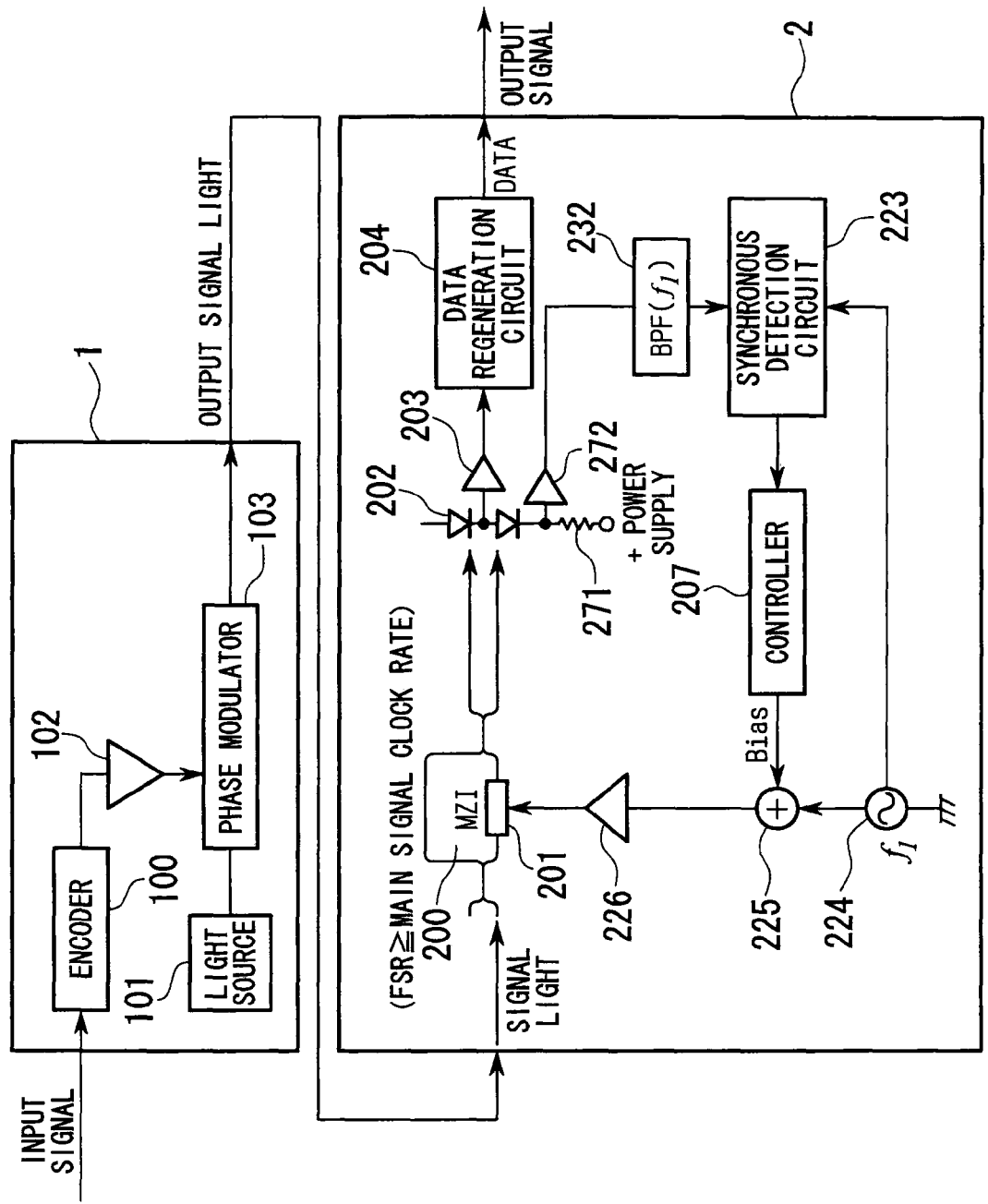
FIG. 17 is a block diagram showing the configuration of the optical transmission system according to a fourteenth embodiment of the present invention.

The optical transmission system of a fourteenth embodiment of the present invention is explained. The configuration of the optical transmission system of the fourteenth embodiment of the present invention is shown in FIG. 17. The optical transmission system of this embodiment differs from the optical transmission system of the first embodiment in that the balanced detection circuit 221 is configured from a balanced photodetector 202, amplifier 203, and resistor 271 to apply a bias voltage to the balanced photodetector 202 from a positive (+) power supply; in that the infinitesimal-modulated signal component detection circuit 222 is configured from a data regeneration circuit 204 which discriminates and regenerates data from the output of the amplifier 203, an amplification circuit 272 which detects the optical current flowing in one of the photodetectors of the balanced photodetector 202 and amplifies the current, and the band-pass filter 232 shown in FIG. 13; and in that the FSR (free spectral range) of the Mach-Zehnder interferometer 200 is set to be somewhat larger than the main signal clock rate (that is, as described below, a prescribed amount within the range in which the main signal penalty can be ignored).

In for example FIG. 13 through FIG. 16, a resistor 271 is in actuality provided, but because the operation in these figures was not directly related, the resistor was not shown. Otherwise the configuration is the same as that of the optical transmission system shown in FIG. 1, and so the same symbols are assigned to the same components, and redundant explanations are omitted.

In a system using a DPSK-DD scheme, the optical signal modulation band is broad compared with the FSR of the Mach-Zehnder interferometer, and there is almost no change in the optical power even if the optical carrier frequency shifts from the peak or bottom of the optical frequency characteristic of the Mach-Zehnder interferometer. Hence detection of an infinitesimal-modulated signal component superposed on the optical signal is difficult. In the case of an RZ-type DPSK signal in particular, the modulation spectrum is broad compared with NRZ-type DPSK signals, and so detection is still more difficult. In this embodiment, the FSR of the Mach-Zehnder interferometer 200 is made sufficiently large that there is no penalty imparted to the main signal clock rate, and consequently, in relative terms the optical signal modulation band is equivalently narrowed, and the infinitesimal-modulated signal component can be easily detected.

Figure 18:
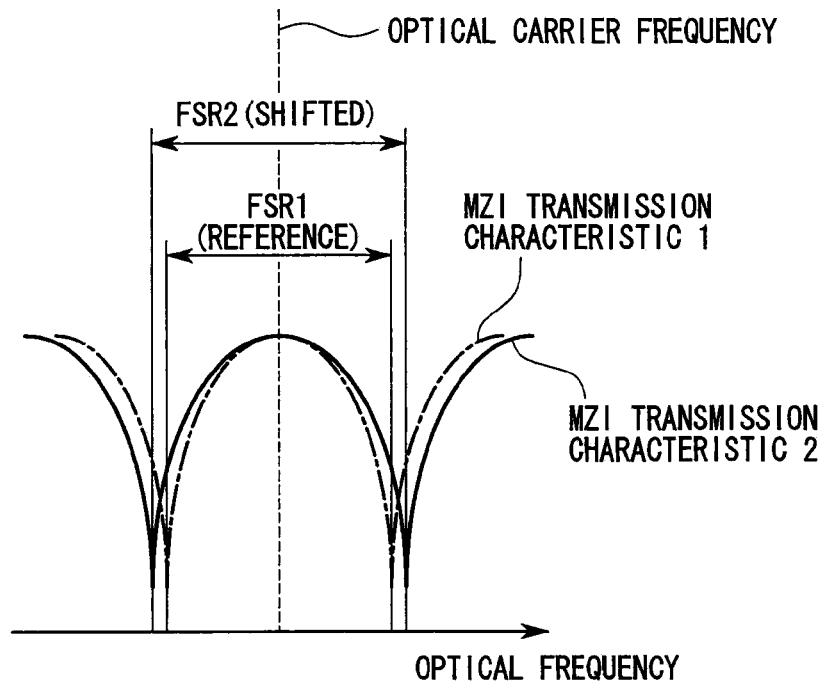
FIG. 18 shows an FSR shift of a Mach-Zehnder interferometer.

FIG. 18 shows the FSR shift of the Mach-Zehnder interferometer 200. The MZI transmission characteristic 1 is the optical frequency characteristic of a Mach-Zehnder interferometer having an FSR (labeled "FSR1 (reference)" in the figure) equal to the main signal clock rate; the MZI transmission characteristic 2 is the optical frequency characteristic of a Mach-Zehnder interferometer having an FSR ("FSR2 (shifted)" in the figure) somewhat larger than the main signal clock rate. The FSR shift is found by taking the difference FSR2−FSR1.

Figure 19:
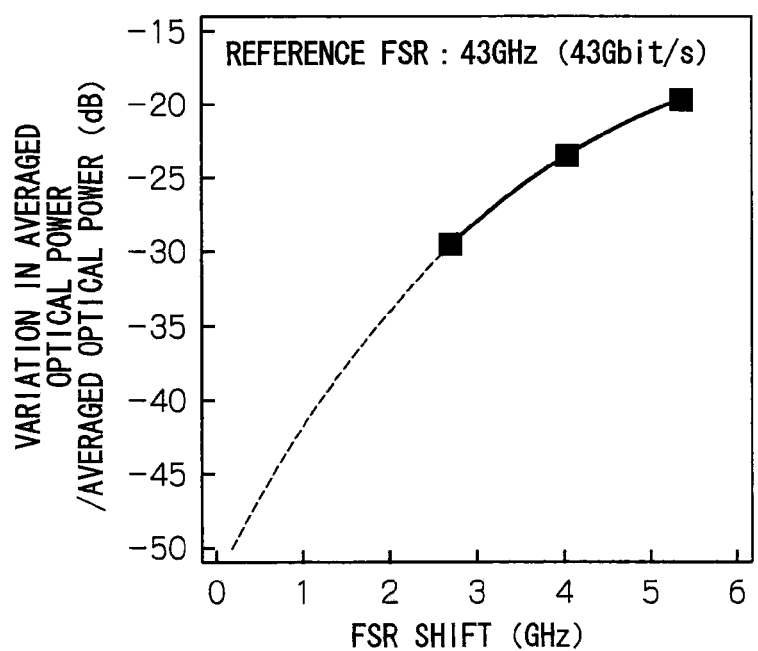
FIG. 19 shows the relation between the FSR shift of a Mach-Zehnder interferometer and the infinitesimal-modulated signal component detection sensitivity.

FIG. 19 shows the relation between the FSR shift and the infinitesimal-modulated signal component detection sensitivity (variation in averaged optical power/averaged optical power). As the FSR shift is increased, the variation in the averaged optical power is seen to increase.

Figure 20:
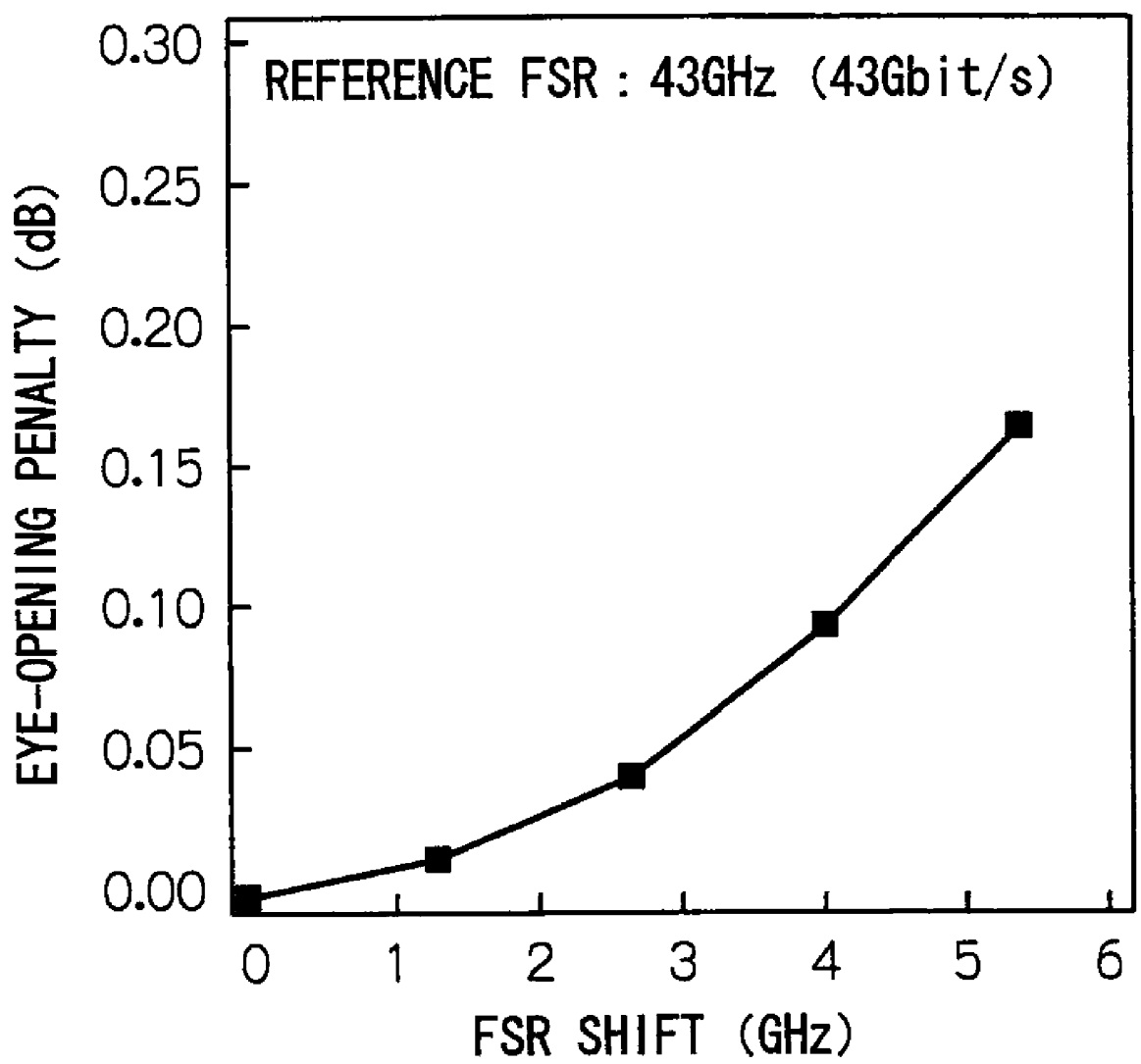
FIG. 20 shows the eye-opening penalty due to the FSR shift of the Mach-Zehnder interferometer.

FIG. 20 shows the main signal eye-opening penalty due to the FSR shift. Within approximately 10% of the bit rate, it is seen that the eye-opening penalty can be held to 0.1 dB or less. Hence by setting the FSR to be somewhat larger than the main signal clock rate, the main signal averaged optical power can be detected with almost no penalty imparted to the main signal, through synchronous detection of the signal by the synchronous detection circuit 223 the error signal component can be extracted, and the error signal component can be fed back to enable locking on the desired state.

The most important advantage of this embodiment is the ability to perform control using a comparatively slow (f1) signal obtained from the power supply terminal of the balanced photodetector 202, without splitting the main signal in the electrical domain.

Fifteenth Embodiment

Figure 21:
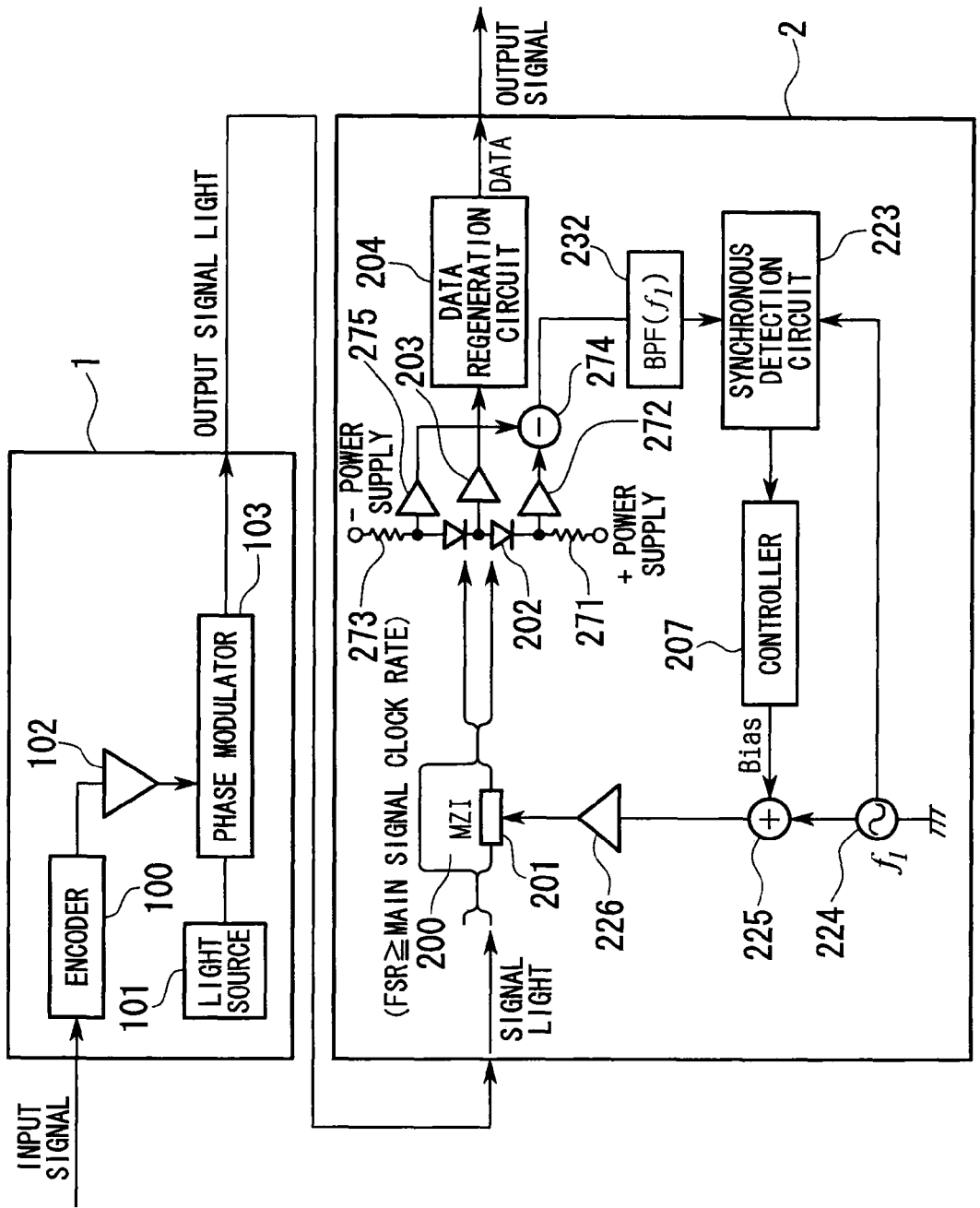
FIG. 21 is a block diagram showing the configuration of the optical transmission system according to a fifteenth embodiment of the present invention.

The optical transmission system of a fifteenth embodiment of the present invention is explained. The configuration of the optical transmission system of the fifteenth embodiment of the present invention is shown in FIG. 21. The optical transmission system of this embodiment differs from the optical transmission system of the fourteenth embodiment in that, rather than taking a signal from the power supply terminal of the photodetector on only one side (the positive power supply side) of the balanced photodetector 202, by using an amplification circuit 275 to detect the optical current of the photodetector on the other side of the balanced photodetector 202 connected to the negative power supply via a resistor 273, signals can be taken from the power supply terminals of the photodetectors on both sides, the difference between the two signals can be determined using a subtracter 274, and this difference can be used in feedback control similar to that in the fourteenth embodiment. Otherwise the configuration is the same as that of the optical transmission system shown in FIG. 17, and so the same symbols are assigned to the same components, and redundant explanations are omitted. By performing balanced detection of the feedback signal for control similarly to the main signal, the detection sensitivity can be further raised.

The most important advantages of this embodiment are the ability to perform control using a comparatively slow (f1) signal obtained from the power supply terminals of the balanced photodetector 202, without splitting the main signal in the electrical domain, and the comparatively high detection sensitivity.

Sixteenth Embodiment

Figure 22:
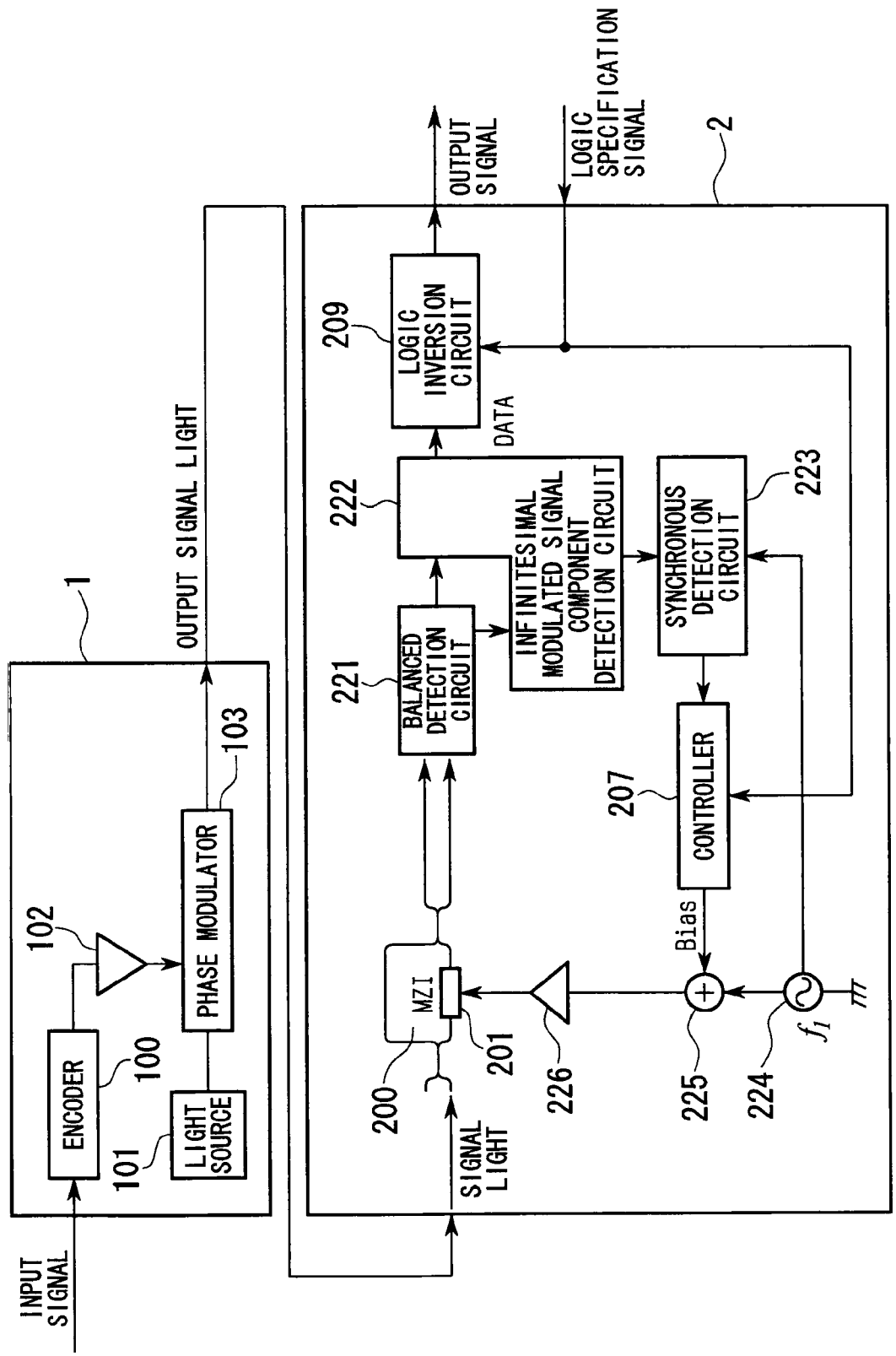
FIG. 22 is a block diagram showing the configuration of the optical transmission system according to a sixteenth embodiment of the present invention.

The optical transmission system of a sixteenth embodiment of the present invention is explained. The configuration of the optical transmission system of the sixteenth embodiment of the present invention is shown in FIG. 22. The optical transmission system of this embodiment differs from the optical transmission system of the first embodiment in that a logic inversion circuit 209 is connected in a stage beyond the infinitesimal-modulated signal component detection circuit 222. This embodiment illustrates the application of the technical concept of the third embodiment to the first embodiment; because the logic inversion circuit 209 is the same as that shown in FIG. 3, the same symbol is assigned, and a redundant explanation is omitted.

The most important advantage of this embodiment is the ability to reduce the maximum value of the initial setting applied to the phase adjustment terminal of the Mach-Zehnder interferometer to ½ or less of the value when a logic inversion circuit is not used.

Seventeenth Embodiment

Figure 23:
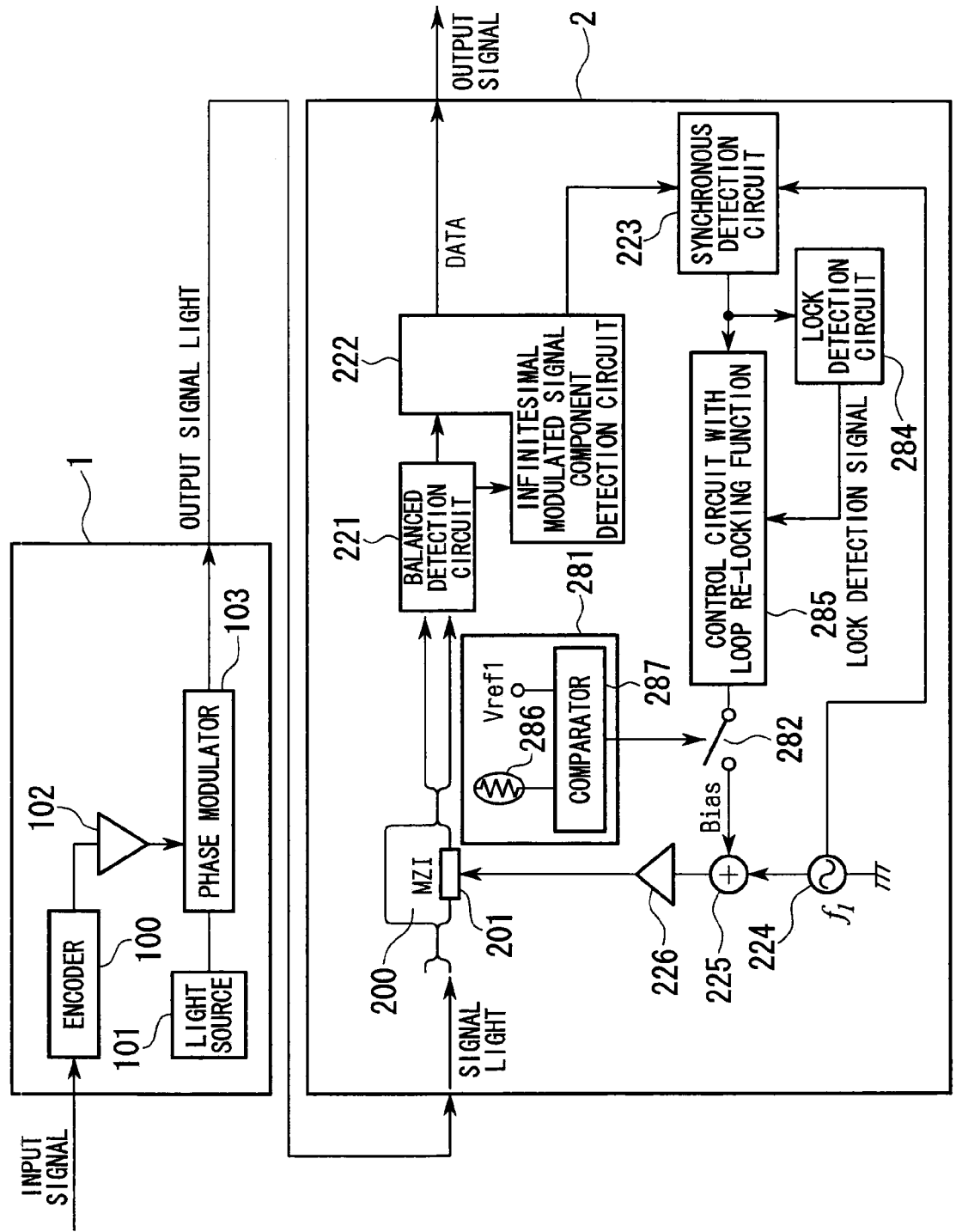
FIG. 23 is a block diagram showing the configuration of the optical transmission system according to a seventeenth embodiment of the present invention.

The optical transmission system of a seventeenth embodiment of the present invention is explained. The configuration of the optical transmission system of the seventeenth embodiment of the present invention is shown in FIG. 23. The optical transmission system of this embodiment differs from the optical transmission system of the first embodiment in that the optical receiver 2 has an MZI warm-up detection circuit 281, which detects the warmed-up state based on the temperature of the Mach-Zehnder interferometer 200; a loop open/close switch 282, which, by opening and closing the control loop which performs feedback control to the Mach-Zehnder interferometer 200, can turn on/off feedback control to the Mach-Zehnder interferometer 200; a synchronous detection circuit 223, which compares the phase of the infinitesimal-modulated signal detected by the infinitesimal-modulated signal component detection circuit 222 with the phase of the infinitesimal-modulated signal output from the infinitesimal-modulated signal oscillation circuit 224, and outputs an error signal; a lock detection circuit 284, which, upon detecting the locked state of the control loop based on the error signal from the synchronous detection circuit 223, outputs a lock detection signal; and a control circuit with loop re-locking function 285, having a function for re-locking when the control loop deviates from a lock on the optical frequency.

Also, the MZI warm-up detection circuit 281 has an MZI temperature monitor 286 which monitors the temperature of the substrate of the Mach-Zehnder interferometer 200 and outputs a voltage corresponding to the temperature, and a comparator 287 which compares the output voltage from the MZI temperature monitor 286 and a reference voltage Vref1, and outputs to the loop open/close switch 282 a signal indicating the result of comparison indicating whether the substrate temperature is within an appropriate range.

In order to use the Mach-Zehnder interferometer at an overall constant temperature, at the time of system startup some time is required until the temperature reaches a preset value. At this time the optical frequency characteristic of the Mach-Zehnder interferometer changes rapidly (drifts), and if an attempt were made to initiate control, there would be the danger of runaway operation. Hence in this embodiment, the control loop is closed only after warm-up of the Mach-Zehnder interferometer 200 has ended. As a result, an unwanted cause of instability can be eliminated.

Further, even if there is a deviation from the lock on the optical frequency due to some unforeseen disturbance, by using the lock detection circuit 284 and the control circuit with loop re-locking function 285, it is possible to again return to the locked state after the disturbance has subsided.

Figure 24:
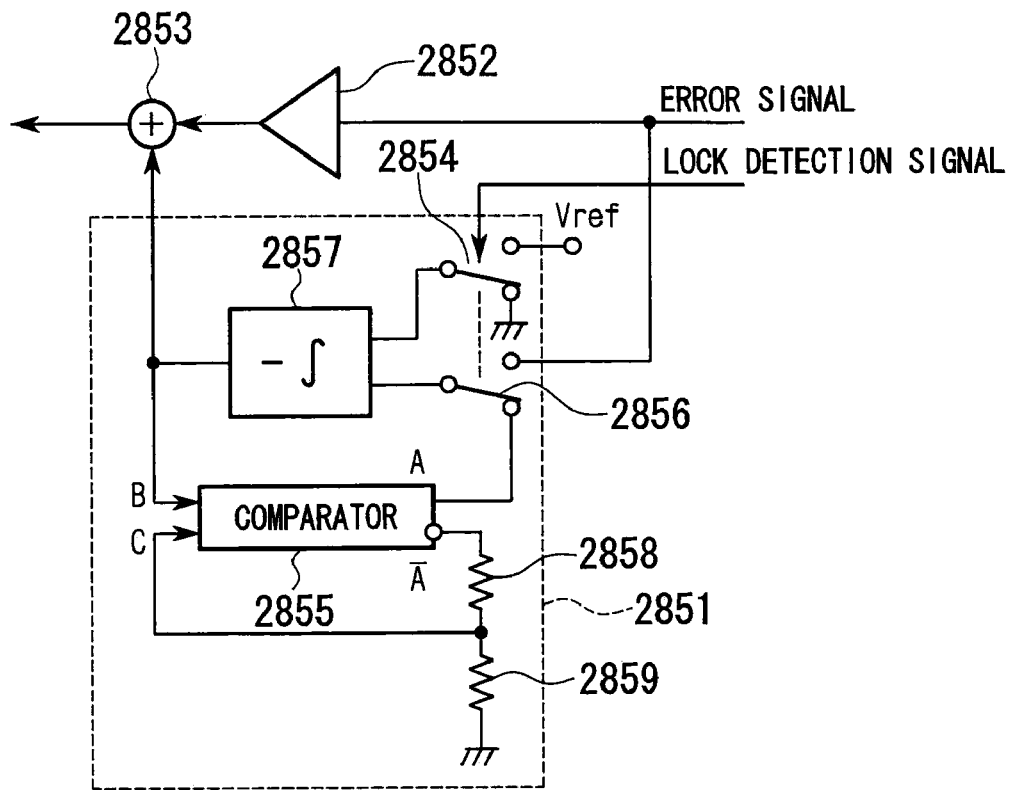
FIG. 24 is a block diagram showing the configuration of a control circuit with a re-locking function.

FIG. 24 shows an example of the configuration of a control circuit with loop re-locking function 285. The control circuit with loop re-locking function 285 has a triangular wave generation circuit 2851, which operates based on a lock detection signal and error signal, an amplifier 2852 which amplifies the error signal, and an adder 2853 which adds the output of the amplifier 2852 and the output of the triangular wave generation circuit 2851 and outputs the result.

The triangular wave generation circuit 2851 has a switch 2854, which switches between the reference voltage Vref and ground according to the lock detection signal; a comparator 2855, which compares the signal B with the signal C, described below, and outputs the comparison result as an output signal A and the inverted output signal of same; a switch 2856, which is a switch operating in concert with the switch 2854, and which switches between the error signal and the output signal A of the comparator 2855 according to the lock detection signal; an integration circuit 2857, which integrates the difference of the two signals supplied via the switch 2854 and the switch 2856; and resistors 2858 and 2859, which divide the inverted output signal of the comparator 2855 to generate the signal C.

When a lock detection signal is detected, one of the inputs to the integration circuit 2857 is connected to the reference voltage Vref by the switch 2854, and the other input to the integration circuit 2857 is connected to the error signal by the switch 2856; by this means the loop of the integration circuit 2857 is closed, and the normal feedback control state is entered. As a result, the error signal shift from the reference voltage Vref is integrated such that the error signal becomes the reference voltage Vref. When a lock detection signal is not detected, one of the inputs to the integration circuit 2857 is connected to ground by the switch 2854, and the other input to the integration circuit 2857 is connected to the output of the comparator 2855 (output signal A) by the switch 2856, so that the integration loop is opened, and a triangular wave is generated by the comparator 2855 and the integration circuit 2857.

Figure 25:
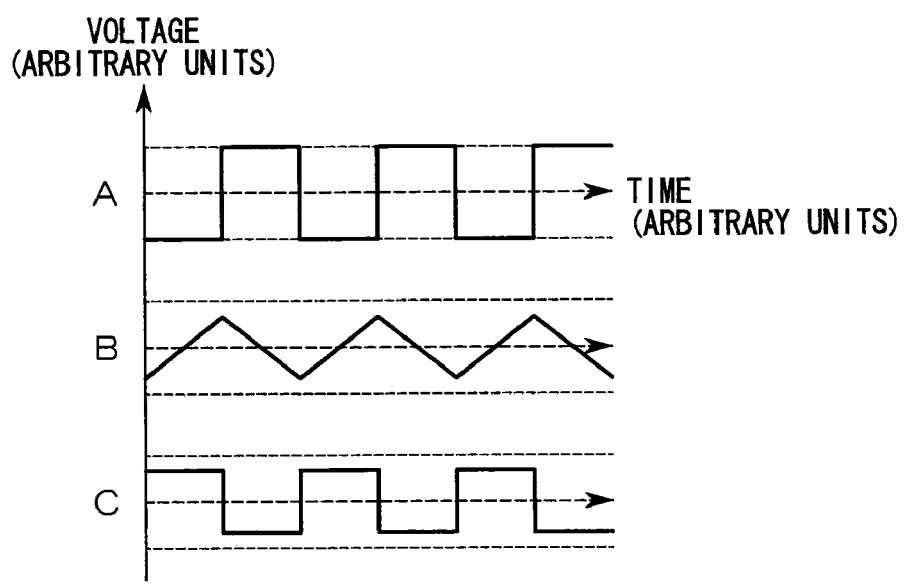
FIG. 25 shows the operation of a triangular wave generation circuit of a control circuit with a re-locking function.

FIG. 25 shows the operation of the triangular wave generation circuit 2851. As explained above, the output signal A is the output of the comparator 2855, the signal C is the result of inversion of the output signal A, fed back to the input of the comparator 2855, and the signal B is the triangular wave output from the integrator 2857. In the comparator 2855, operation is repeated in which signal B and signal C are compared and the case of signal B being greater than signal C is detected and the output signal A and signal C are inverted, so that the triangular wave signal B can be output.

Figure 26:
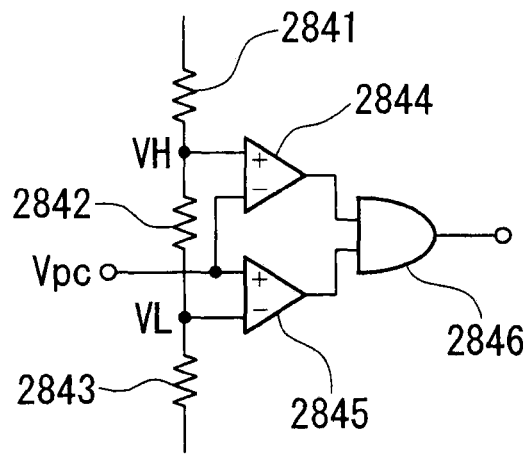
FIG. 26 is a block diagram showing the configuration of a lock detection circuit.

FIG. 26 shows an example of the configuration of the lock detection circuit 284. The lock detection circuit 284 shown has resistors 2841 to 2843, which divide the voltage across the positive and negative power sources to output voltage VH and VL equivalent to the upper limit and the lower limit respectively of the appropriate range for the substrate temperature, described above; a comparator 2844, which compares the voltage Vpc input to the lock detection circuit 284 and the voltage VH; a comparator 2845, which compares the voltage Vpc with the voltage VL; and an AND circuit 2846 which takes the logical product of the outputs of the comparators 2844 and 2845. This lock detection circuit is a threshold circuit which judges the loop to be locked when the voltage Vpc, which is the voltage of the error signal from the synchronous detection circuit 223 shown in FIG. 23, is between the voltage VH and the voltage VL.

Figure 27:
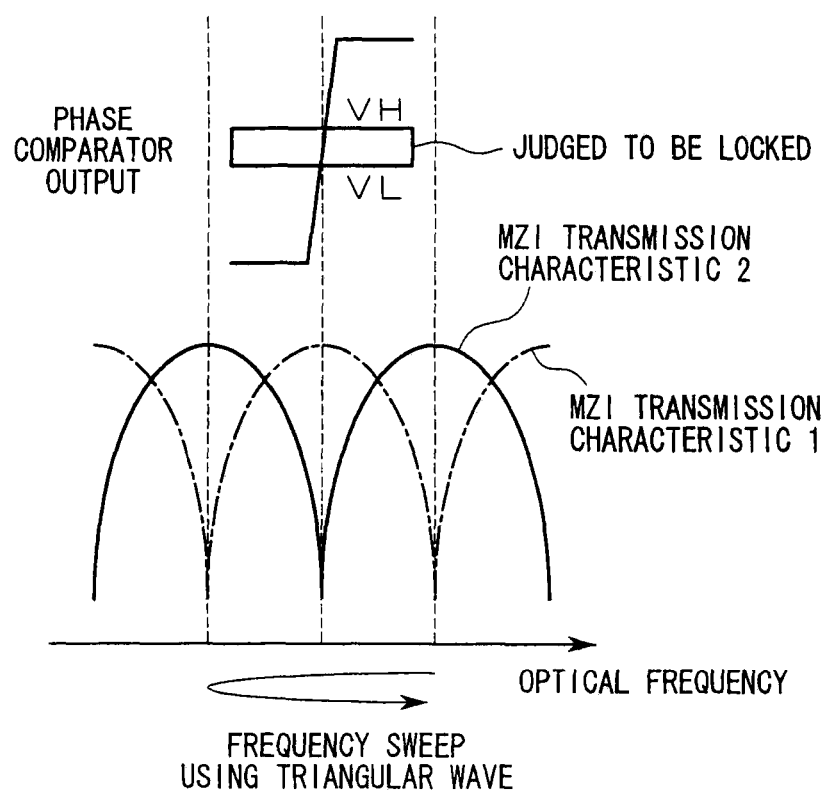
FIG. 27 shows the operation of a lock detection circuit and a triangular wave generation circuit.

FIG. 27 shows the operation of the lock detection circuit 284 and triangular wave generation circuit 2851. When the lock detection circuit 284 judges that the loop is no longer locked, the operation of the control circuit with loop re-locking function 285 switches to the operation of the triangular wave generation circuit, and the current applied to the phase adjustment terminal 201 (see FIG. 23) is swept using the triangular wave, as shown in the figure. While sweeping, if the output voltage of the synchronous detection circuit 223 enters into the lock judgment region between the voltage VH and voltage VL, the operation of the control circuit with loop re-locking function 285 switches from triangular wave generation circuit operation to integration circuit operation, and the control loop is closed.

The most important advantage of this embodiment is that, while rendering unlikely an unstable state, if the loop is no longer locked, the control circuit can again effect return to the locked state. In FIG. 23, the case of application to the first embodiment is shown, but application to other embodiments is also possible.

Eighteenth Embodiment

Figure 28:
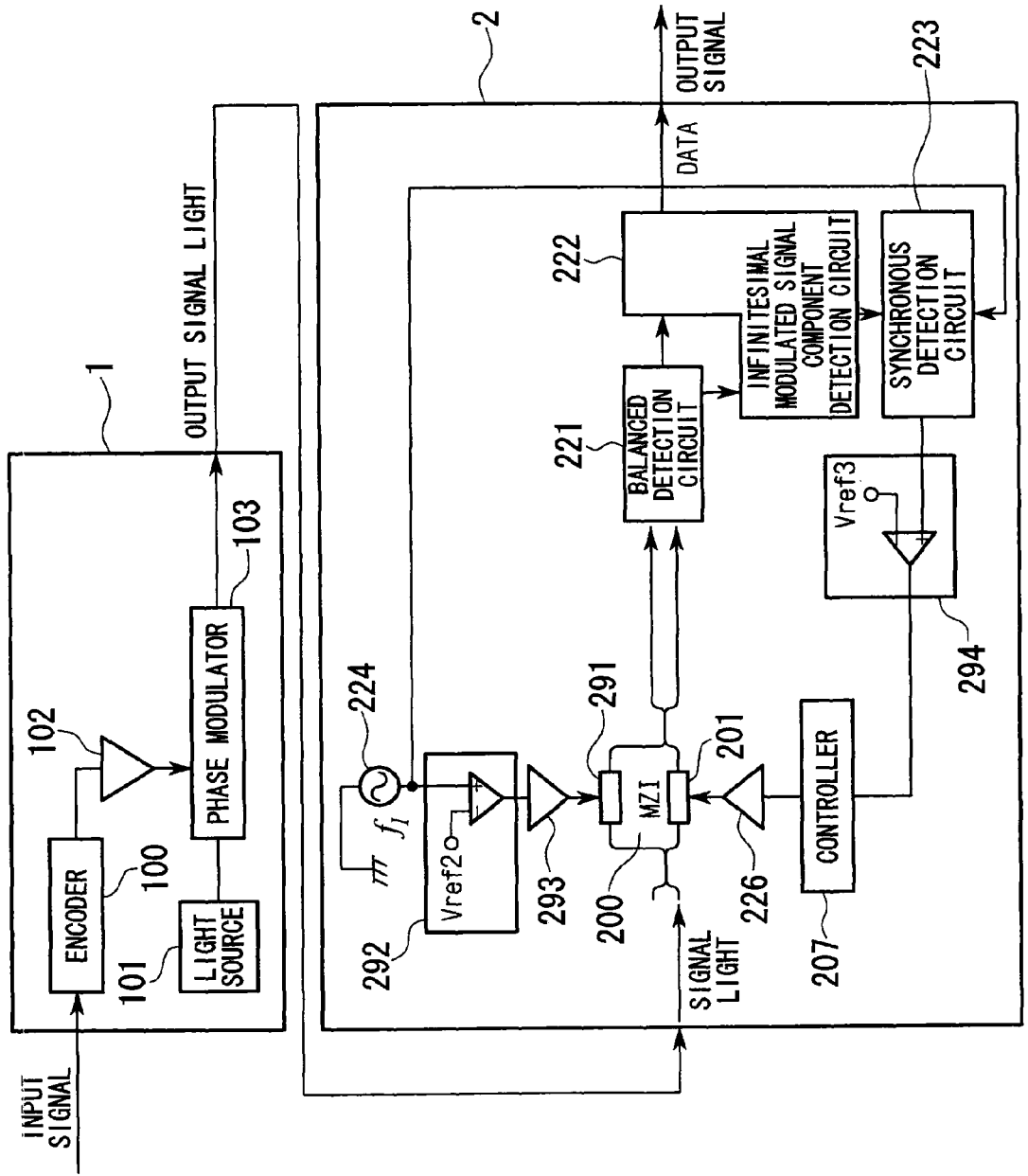
FIG. 28 is a block diagram showing the configuration of the optical transmission system according to an eighteenth embodiment of the present invention.

The optical transmission system of an eighteenth embodiment of the present invention is explained. The configuration of the optical transmission system of the eighteenth embodiment of the present invention is shown in FIG. 28. The optical transmission system of this embodiment differs from the optical transmission system of the first embodiment in that the Mach-Zehnder interferometer 200 has two phase adjustment terminals on each of its two arms (that is, in addition to the phase adjustment terminal 201 described above, a phase adjustment terminal 291 is present), and in that an infinitesimal-modulated signal is applied to one of these (in the figure, the phase adjustment terminal 291), while a feedback control signal (feedback error signal) is applied to the other (in the figure, the phase adjustment terminal 201).

Specifically, an adder 225 is not provided, and there are provided an infinitesimal-modulation operating point setting circuit 292 which compares the reference voltage Vref2 and the output of the infinitesimal-modulated signal oscillation circuit 224 and outputs a signal to set an infinitesimal-modulated signal operating point, a driver 293 which drives the phase adjustment terminal 291 based on the output of the infinitesimal-modulation operating point setting circuit 292, and an MZI offset setting circuit 294 which compares the reference voltage Vref3 and the output of the synchronous detection circuit 223 and outputs a signal to determine the feedback control signal operating point. Otherwise the configuration is the same as that of the optical transmission system shown in FIG. 1, and so the same symbols are assigned to the same components, and redundant explanations are omitted.

For example, in a Mach-Zehnder interferometer which uses a thermooptic effect as the arm optical phase adjustment unit, the efficiency of phase adjustment differs depending on the operating point of the driver circuit. When the infinitesimal-modulated signal and feedback control signal are added by the adder 225 and supplied to the same phase adjustment terminal, the infinitesimal-modulation efficiency changes depending on the magnitude of the feedback control signal, and so it becomes extremely difficult to realize stable operation of the loop and to estimate the penalty. In this embodiment, by providing the phase adjustment terminals for infinitesimal-modulation and for feedback control, the above problem can be resolved. In addition, by providing an infinitesimal-modulation operating point setting circuit 292 and MZI offset setting circuit 294 as reference voltage setting circuits in order to determine the operating points of the infinitesimal-modulated signal and feedback control signal, the respective operating points can be adjusted independently.

In this embodiment, phase adjustment terminals 201 and 291 are provided in each of the two arms of the Mach-Zehnder interferometer 200. However, if the electrodes are divided, an effect similar to the provision of the phase adjustment terminals can be realized, and so a plurality of electrodes may be provided at one of the arms, and infinitesimal-modulated signal and feedback control signals may be applied to the different electrodes.

The most important advantage of this embodiment is the ability to apply the infinitesimal-modulated signal with reliably stable efficiency. In FIG. 28, a case of application to the first embodiment is shown, but application to other embodiments is also possible.

Nineteenth Embodiment

Figure 29:
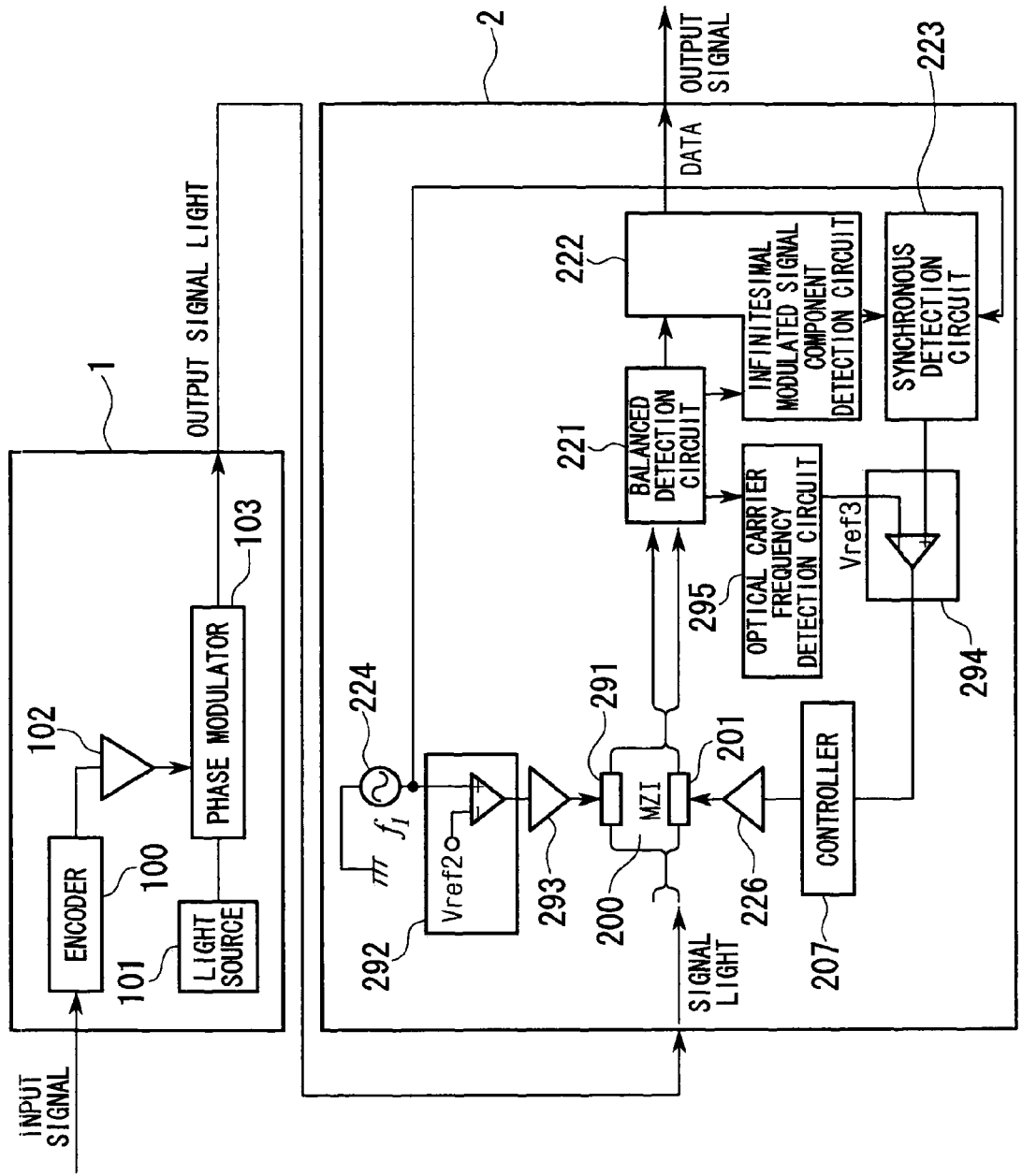
FIG. 29 is a block diagram showing the configuration of the optical transmission system according to a nineteenth embodiment of the present invention; and, FIG. 30 is a block diagram showing the configuration of the optical transmission system according to a twentieth embodiment of the present invention.

The optical transmission system of a nineteenth embodiment of the present invention is explained. The configuration of the optical transmission system of the nineteenth embodiment of the present invention is shown in FIG. 29. The optical transmission system of this embodiment differs from the optical transmission system of the eighteenth embodiment in that the optical receiver 2 has an optical carrier frequency detection circuit 295, which detects the position of the optical carrier frequency relative to the optical frequency characteristic of the Mach-Zehnder interferometer 200, using the detected reception signal light. Otherwise the configuration is the same as that of the optical transmission system shown in FIG. 28, and so the same symbols are assigned to the same components, and redundant explanations are omitted.

When performing control, as in the thirteenth to fifteenth embodiments, to set the peak or bottom of the optical frequency characteristic of the Mach-Zehnder interferometer 200 at the position of maximum averaged power of the optical signal, there may be cases in which, due to the asymmetry of the optical spectrum of the optical modulated signal, the control stability point does not always match the optical carrier frequency. In this embodiment, the optical carrier position is detected by the optical carrier frequency detection circuit 295, and an offset value is applied to the MZI offset setting circuit 294 so as to effect stabilization of the peak or bottom of the optical frequency characteristic of the Mach-Zehnder interferometer 200 at this point.

The optical carrier frequency detection circuit 295 must determine the position of the carrier from the modulation signal without a carrier, and so a method is for example conceivable in which the modulation signal is scanned using a Fabry-Perot resonator to find two minima in the optical spectrum, and the optical carrier frequency is taken to be the midpoint between these two frequencies.

The most important advantage of this embodiment is the ability to cause the peak or bottom of the optical frequency characteristic of the Mach-Zehnder interferometer to match the optical carrier frequency, even when the optical modulated signal spectrum is asymmetric. In FIG. 29, this embodiment is applied to the eighteenth embodiment, which is based on the first embodiment; but application to configurations based on other embodiments is also possible.

Twentieth Embodiment

Figure 30:
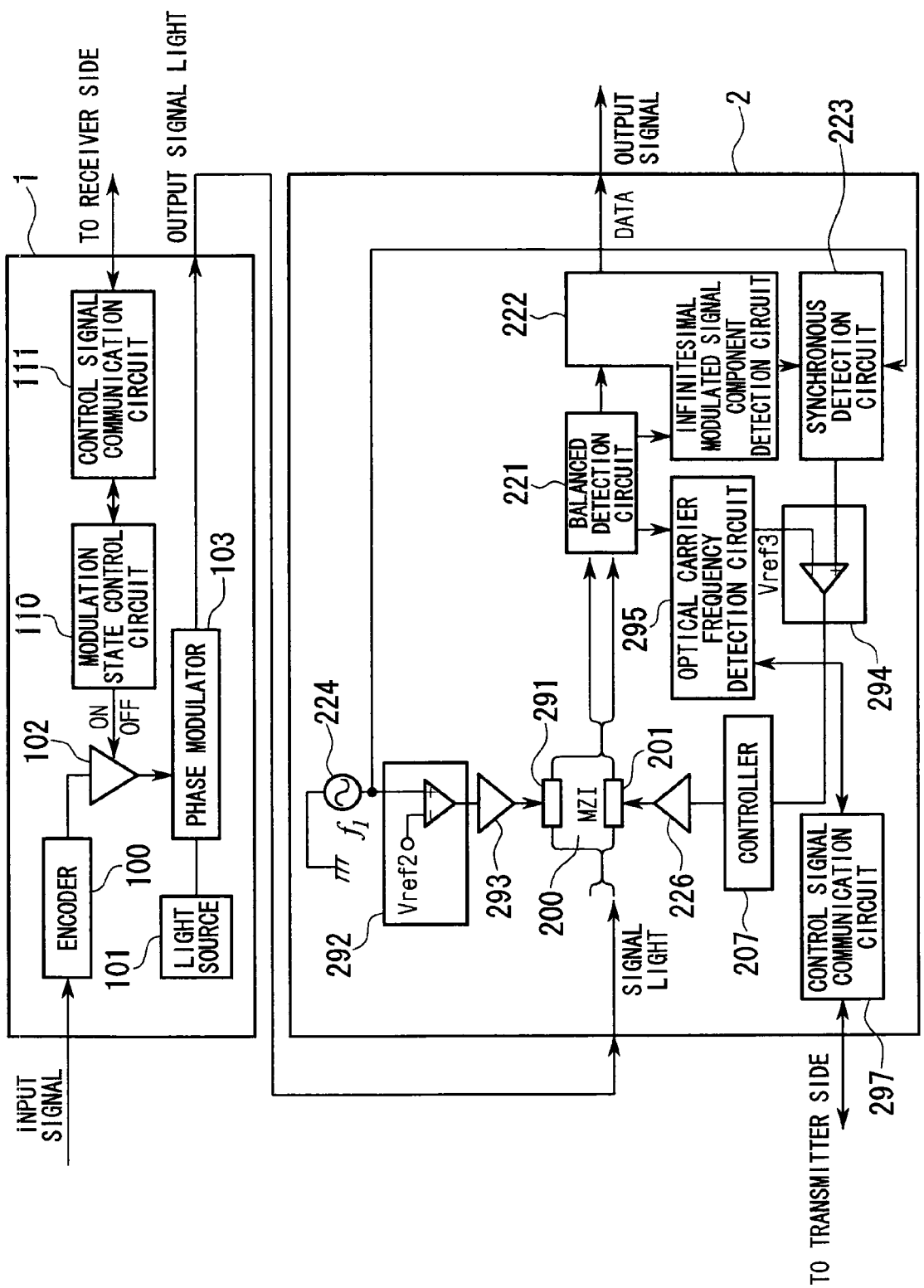

The optical transmission system of a twentieth embodiment of the present invention is explained. The configuration of the optical transmission system of the twentieth embodiment of the present invention is shown in FIG. 30. The optical transmission system of this embodiment differs from the optical transmission system of the nineteenth embodiment in that the optical transmitter 1 has a modulation state control circuit 110 which can turn modulation of the main signal on and off, and a control signal communication circuit 111 which exchanges control signals with the optical receiver 2 using a control line provided separately from the line for main signals, and in that the optical receiver 2 has a control signal communication circuit 297 which exchanges control signals with the optical transmitter 1 using the control line. Otherwise the configuration is the same as that of the optical transmission system shown in FIG. 29, and so the same symbols are assigned to the same components, and redundant explanations are omitted.

By enabling the optical transmitter 1 to turn off modulation of main signals, the unmodulated optical carrier alone can be transmitted to the receiving side, and at the optical receiver 2 the optical carrier can be used to easily determine the optical carrier frequency. On the receiving side, the optical carrier frequency detection circuit 295 uses information relating to this optical carrier frequency received via the control signal communication circuit 297 to provide an offset value to the MZI offset setting circuit 294, such that the optical carrier frequency matches the peak or the bottom frequency of the optical frequency characteristic of the Mach-Zehnder interferometer 200.

As the specific operation, upon startup of the optical transmission system the optical transmitter 1 turns off modulation of the main signal, and transmits only the optical carrier. The optical receiver 2 detects the position of the frequency of the optical carrier sent from the optical transmitter 1 relative to the optical frequency characteristic of the Mach-Zehnder interferometer 200, and adjusts the offset value of the MZI offset setting circuit 294 such that the position of the optical carrier frequency matches the peak or bottom of the optical frequency characteristic of the Mach-Zehnder interferometer 200. Next, the optical receiver 2 sends a control signal indicating completion of offset adjustment via the control signal communication circuit 297 to the optical transmitter 1. Upon receiving the control signal via the control signal communication circuit 111, the optical transmitter 1 causes the modulation state control circuit 110 to control the modulator driving circuit 102 to turn on modulation of the main signal.

The most important advantages of this embodiment are the ability to easily detect the optical carrier frequency even when the optical modulated signal spectrum is asymmetric, and the ability to match the optical carrier frequency with the peak or bottom of the optical frequency characteristic of the Mach-Zehnder interferometer. In FIG. 30, the case of application to the nineteenth embodiment, based on the first embodiment, is explained; but application to configurations based on other embodiments is also possible.

In the above, embodiments of the present invention have been explained referring to the drawings. However, these embodiments are merely illustrations of the present invention, and the present invention clearly is not limited to these embodiments. Hence various additions, omissions, substitutions, and other alterations may be made, insofar as there is no deviation from the spirit or scope of the present invention.

INDUSTRIAL APPLICABILITY

This invention relates to an optical transmission system, and to an optical transmitter and optical receiver for an optical transmission system, to which a DPSK-DD scheme is applied; the phase difference in the signal light of the two arms of a Mach-Zehnder interferometer provided in the optical receiver is modulated at a constant frequency, and the phase of the component at that frequency is detected. As a result, it is possible to set the optimum operating point of the Mach-Zehnder interferometer matching the optical frequency of the transmitting-side light source, so that optimal photo-detection characteristics can be obtained.

The invention claimed is:

1. An optical transmission system comprising:
an optical transmitter which outputs differential-encoded phase-modulated light; and
an optical receiver which detects the phase-modulated light and performs demodulation,
wherein the optical transmitter comprises: an encoder which converts NRZ code input signals into NRZ-I code signals; and a phase modulator which, for marks and spaces encoded by the encoder, outputs phase-modulated light with a phase deviation $\Delta\phi$ imparted over a range $0 \leq \Delta\phi \leq \pi$,
the optical receiver comprises:
a Mach-Zehnder interferometer with phase-adjustment terminal to set a phase difference between two interfering signals, which splits the phase-modulated light which has been received into two signal light beams, delays one of the split signal light beams by one bit, and causes the two signal light beams to interfere to effect conversion into intensity-modulated light;
a balanced detection circuit which performs photoelectric conversion of signal light from two output ports of the Mach-Zehnder interferometer, and outputs a difference in converted electrical signals;
a low-frequency signal generation circuit which applies a first low-frequency signal at frequency f1 to the phase-adjustment terminal of the Mach-Zehnder interferometer;
an infinitesimal-modulated signal component detection circuit which detects a second low-frequency signal from a signal supplied by the balanced detection circuit;
a synchronous detection circuit which, by synchronous detection of the second low-frequency signal output from the infinitesimal-modulated signal component detection circuit using the first low-frequency signal output from the low-frequency signal generation circuit, detects a shift amount and direction of shift between a center wavelength of the phase-modulated light output from the optical transmitter and a pass band wavelength of the Mach-Zehnder interferometer;
a control circuit which outputs a control signal to adjust the phase difference between the two split signal light beams so as to correct the shift amount;
a driver circuit which drives the phase adjustment terminal based on the control signal;
a temperature detection circuit which detects the temperature of a substrate of the Mach-Zehnder interferometer; and a loop open/close switch which turns on and off feedback control to the Mach-Zehnder interferometer,
wherein when the temperature of the substrate of the Mach-Zehnder interferometer is not within a temperature range indicating that warm-up of the Mach-Zehnder interferometer has ended, the loop to perform the feedback control is opened, whereas when the temperature of the substrate of the Mach-Zehnder interferometer is within the temperature range, the loop is closed to perform the feedback control.

2. The optical transmission system according to claim 1, wherein the infinitesimal-modulated signal component detection circuit comprises: an eye-opening monitoring circuit which outputs a signal obtained by monitoring an eye opening of a signal split from the signal output from the balanced detection circuit; and a band-pass filter which passes the second low-frequency signal contained in the signal output from the eye-opening monitoring circuit, and the synchronous detection circuit detects the shift amount and direction based on an output signal of the band-pass filter.

3. The optical transmission system according to claim 1, wherein the infinitesimal-modulated signal component detection circuit comprises a data regeneration circuit which discriminates and regenerates an electrical signal output from the balanced detection circuit,
the optical receiver further comprises: a logic inversion circuit which inverts the logic of an output signal of the data regeneration circuit and outputs an inverted signal; a selection unit which selectively outputs either the output signal of the data regeneration circuit or an output of the logic inversion circuit according to a prescribed logic specification signal; and a polarity selection unit which inverts the polarity of a feedback error signal within the control circuit when the output of the logic inversion circuit has been selected,
an amount of correction of the shift between the center wavelength of the phase-modulated light output from the optical transmitter and the pass band wavelength of the Mach-Zehnder interferometer is reduced to ½ or less of a repetition frequency of the Mach-Zehnder interferometer.

4. An optical receiver, in an optical transmission system comprising: an optical transmitter which outputs differential-encoded, phase-modulated light; and the optical receiver which detects the phase-modulated light and performs demodulation, wherein the optical transmitter comprises: an encoder which converts NRZ code input signals into NRZ-I code signals; and a phase modulator which, for marks and spaces encoded by the encoder, outputs phase-modulated light with a phase deviation $\Delta\phi$ imparted over the range $0 \leq \Delta\phi \leq \pi$, the optical receiver comprises:
- a Mach-Zehnder interferometer with phase-adjustment terminal to set a phase difference between two interfering signals, which splits the phase-modulated light which has been received into two signal light beams, delays one of the split signal light beams by one bit, and causes the two signal light beams to interfere to effect conversion into intensity-modulated light;
- a balanced detection circuit which performs photoelectric conversion of signal light from two output ports of the Mach-Zehnder interferometer, and outputs a difference in converted electrical signals;
- a low-frequency signal generation circuit which applies a first low-frequency signal at frequency f1 to the phase-adjustment terminal of the Mach-Zehnder interferometer;
- an infinitesimal-modulated signal component detection circuit which detects a second low-frequency signal from a signal supplied by the balanced detection circuit;
- a synchronous detection circuit which detects a shift amount and direction of shift between a center wavelength of the phase-modulated light output from the optical transmitter and a pass band wavelength of the Mach-Zehnder interferometer, through synchronous detection of the second low-frequency signal output from the infinitesimal-modulated signal component detection circuit using the first low-frequency signal output from the low-frequency signal generation circuit;
- a control circuit which outputs a control signal to adjust the phase difference between the two split signal light beams so as to correct the shift amount;
- a driver circuit which drives the phase adjustment terminal based on the control signal;
- a temperature detection circuit which detects the temperature of a substrate of the Mach-Zehnder interferometer; and a loop open/close switch which turns on and off feedback control to the Mach-Zehnder interferometer, wherein when the temperature of the substrate of the Mach-Zehnder interferometer is not within a temperate range indicating that warm-up of the Mach-Zehnder interferometer has ended, the loop which performs the feedback control is opened, whereas when the temperature of the substrate of the Mach-Zehnder interferometer is within the temperature range the loop is closed to perform the feedback control.

5. The optical receiver of an optical transmission system according to claim 4, wherein the infinitesimal-modulated signal component detection circuit comprises: an eye-opening monitoring circuit which outputs a signal obtained by monitoring an eye opening of a signal split from the signal output from the balanced detection circuit; and a band-pass filter which passes the second low-frequency signal contained in the signal output from the eye-opening monitoring circuit, and the synchronous detection circuit detects the shift amount and direction based on an output signal of the band-pass filter.

6. The optical receiver of an optical transmission system according to claim 4, wherein the infinitesimal-modulated signal component detection circuit comprises a data regeneration circuit which discriminates and regenerates an electrical signal output from the balanced detection circuit, the optical receiver further comprises: a logic inversion circuit which inverts the logic of an output signal of the data regeneration circuit and outputs an inverted signal; a selection unit which selectively outputs either the output signal of the data regeneration circuit or an output of the logic inversion circuit according to a prescribed logic specification signal; and a polarity selection unit which inverts the polarity of a feedback error signal within the control circuit when the output of the logic inversion circuit has been selected, an amount of correction of the shift between the center wavelength of the phase-modulated light output from the optical transmitter and the pass band wavelength of the Mach-Zehnder interferometer is reduced to ½ or less of a repetition frequency of the Mach-Zehnder interferometer.

* * * * *